(12) United States Patent
Hampel et al.

(10) Patent No.: US 11,252,803 B2
(45) Date of Patent: Feb. 15, 2022

(54) OPERATING DEVICE WITH STAGGERED PROTECTION CIRCUITS AGAINST OVERVOLTAGE AND OVERCURRENT AND ANTENNA FOR DRIVING INTELLIGENT LAMPS AND LIGHTING APPLIANCES

(71) Applicant: iAd Gesellschaft für Informatik, Automatisierung und Datenverarbeitung mbH, Großhabersdorf (DE)

(72) Inventors: Hermann Hampel, Großhabersdorf (DE); Johannes Hampel, Großhabersdorf (DE); Ulrich Berold, Nuremberg (DE); Markus Pieger, Forchheim (DE)

(73) Assignee: iAd Gesellschaft für Informatik, Automatisierung und Datenverarbeitung mbH, Großhabersdorf (DE)

( * ) Notice: Subject to any disclaimer, the term of this patent is extended or adjusted under 35 U.S.C. 154(b) by 312 days.

(21) Appl. No.: 16/338,761

(22) PCT Filed: Oct. 5, 2017

(86) PCT No.: PCT/EP2017/025301
§ 371 (c)(1),
(2) Date: Apr. 2, 2019

(87) PCT Pub. No.: WO2018/065120
PCT Pub. Date: Apr. 12, 2018

(65) Prior Publication Data
US 2021/0298153 A1    Sep. 23, 2021

(30) Foreign Application Priority Data
Oct. 5, 2016 (DE) .................... 10 2016 011 815.6

(51) Int. Cl.
*H05B 45/56* (2020.01)
*F21K 9/238* (2016.01)
(Continued)

(52) U.S. Cl.
CPC ............. *H05B 45/56* (2020.01); *F21K 9/238* (2016.08); *H02H 3/046* (2013.01); *H02H 3/085* (2013.01);
(Continued)

(58) Field of Classification Search
CPC ................................. H05B 45/56; H02H 3/20
See application file for complete search history.

(56) References Cited

U.S. PATENT DOCUMENTS 5,299,088 A * 3/1994 Honl ...................... H02H 9/042
                                                                361/119
7,079,808 B2   7/2006 Striemer
(Continued)

FOREIGN PATENT DOCUMENTS

CN    204291046 U    4/2015
DE       260153 A1   9/1988
(Continued)

OTHER PUBLICATIONS

International Search Report dated May 29, 2018 filed in PCT/EP2017/025301.

*Primary Examiner* — Amy Cohen Johnson
*Assistant Examiner* — Jianzi Chen
(74) *Attorney, Agent, or Firm* — Rankin, Hill & Clark LLP

(57) ABSTRACT

In order to achieve a universal, flexible and highly integrated operating device for driving various lamps, ensuring the protection of the entire operating device and of the appliances connected thereto by means of staggered protective
(Continued)

Figure 1:
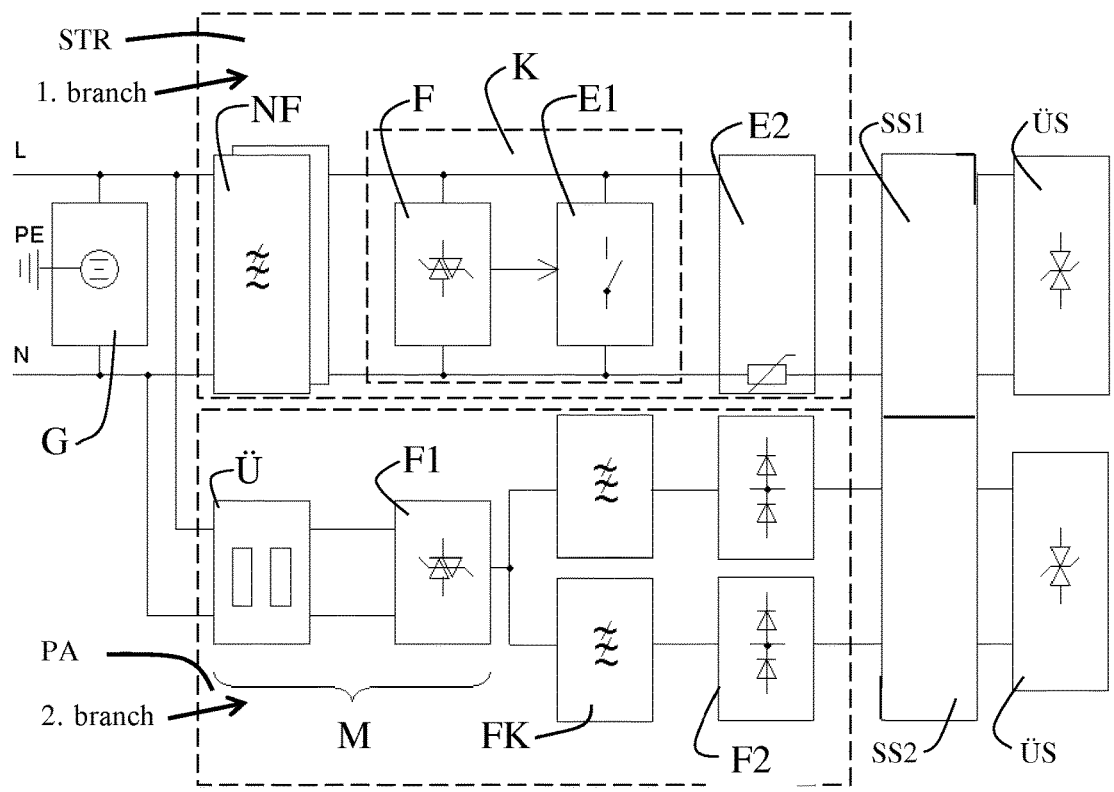

measures at both the input and the output, starting from the preamble of claim 1, a first branch for connecting a lamp to a first of the interface circuits (SS1) and a second branch for connecting at least one communication module to a second of the interface circuits (SS2) are connected to the coarse protection circuit (G) which short-circuits an overvoltage of the mains voltage occurring at the input of the operating device. In the first branch, a line filter (NF) is connected to the coarse protection circuit (G) and a clamp circuit (K) consisting of the fine protection circuit (F) and of a first energy absorber (E1) is connected to the line filter (NF). When the residual pulse voltage is too high, the fine protection circuit (F) activates the first energy absorber (E1), the overvoltage pulse is short-circuited and the short-circuit is deactivated again when the mains voltage reaches the next zero crossing. A second energy absorber (E2) which, when it is switched on, limits the current with the aid of a temperature-dependent resistor (NTC), is connected to the first energy absorber (E1). Moreover, the first interface circuit (SS1) comprises a protection circuit (ÜS) against overvoltage and overcurrent, and an intermediate protection circuit (M) consisting of a transmitter (Ü) and of a first fine protection circuit (F1) is connected to the coarse protection circuit (G) in the second branch. A filter (FK) for separating communication signals fed in parallel into the power supply grid is connected to the first fine protection circuit (F) and a second fine protection circuit (F2) is connected to this filter (FK). In order to protect the second interface circuit (SS2) of the operating device from overvoltage and overcurrent coming from the communication module and acting upon the operating device, the second interface circuit (SS2) comprises a protection circuit (ÜS) against overvoltage and overcurrent. The invention is used in the field of protection systems against overvoltage.

15 Claims, 8 Drawing Sheets

(51) Int. Cl.
*H05B 47/185* (2020.01)
*H05B 47/19* (2020.01)
*H02H 3/04* (2006.01)
*H02H 3/08* (2006.01)
*H02H 3/20* (2006.01)
*F21Y 115/10* (2016.01)

(52) U.S. Cl.
CPC .............. *H02H 3/20* (2013.01); *H05B 47/185* (2020.01); *H05B 47/19* (2020.01); *F21Y 2115/10* (2016.08)

(56) References Cited

U.S. PATENT DOCUMENTS

| | | |
|---|---|---|
| 2007/0063903 A1 | 3/2007 | Mun |
| 2010/0085179 A1 | 4/2010 | Shank et al. |
| 2011/0038089 A1* | 2/2011 | Kasper .................. H01H 71/04 361/115 |
| 2013/0140992 A1 | 6/2013 | Lee |
| 2014/0300293 A1 | 10/2014 | Ruan et al. |
| 2015/0048754 A1 | 2/2015 | Davies et al. |
| 2015/0259078 A1 | 9/2015 | Filipovic et al. |
| 2015/0279207 A1* | 10/2015 | Breuer .................. G08C 23/04 398/106 |
| 2015/0327349 A1 | 11/2015 | Lee et al. |
| 2015/0342006 A1 | 11/2015 | Bosua et al. |

FOREIGN PATENT DOCUMENTS

| | | |
|---|---|---|
| DE | 264094 A1 | 1/1989 |
| DE | 300256 A5 | 5/1992 |
| DE | 29602914 U1 | 6/1997 |
| DE | 202004020723 U1 | 1/2006 |
| DE | 202006016649 U1 | 12/2006 |
| DE | 102006037803 A1 | 4/2007 |
| DE | 102005063443 A1 | 1/2008 |
| DE | 102009031967 B3 | 5/2011 |
| DE | 102011007416 A1 | 10/2012 |
| DE | 102012109829 A1 | 6/2013 |
| DE | 102013102312 B3 | 7/2014 |
| EP | 1850500 A1 | 10/2007 |
| EP | 2944863 A1 | 11/2015 |
| FR | 2665031 A1 | 1/1992 |
| WO | 2012022555 A1 | 2/2012 |
| WO | 2012146212 A1 | 11/2012 |
| WO | 2015179200 A1 | 11/2015 |

* cited by examiner

OPERATING DEVICE WITH STAGGERED PROTECTION CIRCUITS AGAINST OVERVOLTAGE AND OVERCURRENT AND ANTENNA FOR DRIVING INTELLIGENT LAMPS AND LIGHTING APPLIANCES

The invention relates to, according to the preamble of claim 1, an operating device with an input coarse protection, an output with separate interface circuits and an output fine protection and arranged between the coarse protection and fine protection, designed as a filter decoupling for the protection, control and power supply connected thereto lamps. The invention relates to, according to claim 11, a lamp with a control gear according to claim 1 Finally, the invention relates, according to claim 12, an operating device according to claim 1 or lamp according to claim 11 with an antenna.

In telecommunication technology (telecommunications switching systems, signaling equipment, etc.) circuit arrangements for the combined protection of electronic devices against overvoltage and overcurrent, which are commonly referred to as secondary or fine protection, have long been known. For so-called coarse protection or primary protection, surge arresters based on smoldering or spark gaps are used. For fine protection three basic arrangements and their combinations are known:
1. Varistors connected in parallel with the voltage limitation,
2. Use of temperature-dependent resistors in series and parallel connection for current and voltage limitation,
3. Use of semiconductors such as transistors, thyristors, triacs and diodes in series and parallel connection for current and voltage limitation.

While temperature-dependent resistors have a too large time constant to provide ideal protection, varistors are fixed to only one voltage value—the rated voltage.

This rated voltage can already lead to destruction of certain system components in different operating conditions with small resistances. A really sufficient protection of sensitive electronic devices can only be achieved by combined current and voltage-valued semiconductor circuits. From DD 260 153 A1 a circuit arrangement for reliable protection against overcurrent and overvoltage is known in which by the use of a power switching element in case of overload limited by a bidirectional switch with a current and voltage sensor controlled cross-flow current and voltage at the output.

Furthermore, DD 264 094 A1 discloses an arrangement for protecting the input components of a low-voltage control for high-voltage circuit breaker, whereas in the control line to be protected the switching process triggering electronic semiconductor components coarse protection and fine protection means using overvoltage protection elements and frequency-selective delay elements are provided. Specifically, the coarse protection means is formed of a resistor combination in which a resistor, a varistor and another resistor are connected in series. Furthermore, on one hand the fine protection means for a glitch times greater than the response time of the varistor comprises a low-pass filter, which is formed from a varistor connected in parallel series connection of a resistor and a capacitor, and on the other hand for glitch times smaller than the response time of the varistor comprises a resistance combination of the resistors included in between the two latter resistors in series and to the capacitor in parallel Z-diode and a capacitor connected in parallel to the RF capacitor. In this parallel circuit of Zener diode, RF capacitor are in turn connected as a parallel connection and integrated the control electrode or the control electrodes of the electronic semiconductor component or the electronic semiconductor devices.

In the zero and low frequency operated low-voltage technology (networks with voltages <50 V and currents <2 A) and heavy current engineering up to $380V_{eff}$ are used individual elements as overvoltage protection in the form of spark gaps, gas-filled surge arresters, varistors and diodes with strong non-linear characteristic, e.g. Zener diodes. Wherever the electrical values to be processed permit it, relatively expensive isolating transformers are also used as individual elements for limiting and galvanic decoupling. In the zero and low frequency operated low-voltage technology (networks with voltages <50 V and currents <2 A) and heavy current engineering up to $380V_{eff}$ are used individual elements as overvoltage protection in the form of spark gaps, gas-filled surge arresters, varistors and diodes with strong non-linear characteristic, e.g. Zener diodes. Wherever the electrical values to be processed permit it, relatively expensive isolating transformers are also used as individual elements for limiting and galvanic decoupling. Measurements have shown that such a surge protection from a single element is not able to effectively limit, in particular very steeply increasing and prolonged overvoltage, to values that are safe for the device to be protected or the plant. In the case of protective elements based on semiconductors, there is a risk of thermal destruction over a longer period of time due to the low surge current carrying capacity. Isolation transformers lose their protective effect due to saturation effects. Unfavorable is also their inductive storage capacity, thereby the incoming overvoltage energy is indeed initially absorbed, but then submitted out of phase, but with changed time characteristic to the device to be protected or the system. To avoid this the DD 300 256 A1 discloses a device for limitation of overvoltages in low-frequency communication, data transmission, measuring, control and regulation systems as well as in electric power generation, distribution and consumer installations with direct or alternating voltage up to $380V_{eff}$, the overvoltage protection device consists of the interconnection of a gas-filled surge arrester as coarse protection via a suitable, connecting component with a zinc oxide varistor as fine protection. Surge arresters and zinc oxide varistors complement each other in terms of time and quantity in the realization of the protective function. The connection device, usually an ohmic resistor or an inductor, favors this process and causes both the flow of energy under normal operating conditions as well as a control of the energy entered by the incoming overvoltage and their distribution to the two, the overvoltage limiting components. In the steep rising phase of an incoming overvoltage during the ignition delay time of the surge arrester it is initially limited by the zinc oxide varistor with its upstream ohmic or inductive resistance. With the ignition of the surge arrester, the energy absorption of the overvoltage is distributed to all components of the overvoltage protection device, whereby the surge current carrying capacity of the surge arrester as well as the advantageously low and selectable within wide limits limiting voltage of the zinc oxide varistor have an advantageous effect. The protective effect occurs regardless of the polarity of the overvoltage and with a staggering of the limiting voltages of the zinc oxide varistors of 25V up to 800V, the most diverse voltage levels for example, NF-voice connections can dominate up to 20 kHz.

In order to provide an overvoltage protection for a power supply, which has over a wide bandwidth a good barrier against overvoltages of any kind DE 20 2006 016 649 U1 discloses an input coarse protection and an output fine protection as well as a decoupling in form of a protection circuit arranged between the coarse protection and fine protection, in which the components of the coarse protection, the components of the fine protection and the components of the decoupling are arranged closely adjacent at a common component carrier in a common housing.

The coarse protection consists of varistors, wherein a varistor is connected to the earth conductor via a gas-filled surge arrester which galvanically separates the coarse protection from the earth conductor. Only when an overvoltage occurs, the surge arrester switches through, so that only at a short time a current flows through the ground conductor PE. Furthermore, separating devices are provided, which form a temperature monitor for the varistors and are expediently formed, for example, by a temperature solder. If the temperature solder melts due to a corresponding overload of the varistors, the overloaded varistor is disconnected from the mains. If one of the disconnectors responds due to an overload, the overloaded varistor is disconnected from the mains and the operation indicator in the form of an LED for the respective varistor goes out. The decoupling between the coarse protection and the fine protection is designed as a filter, which as common mode filter, push-pull filter or Low-pass filter can be designed. Such a filter consists of a series circuit arranged in each line of an inductance and an ohmic resistance, as well as a between the lines of the phase connected capacitor. The inductors are expediently designed as longitudinal coils, in particular as a coil with an iron core. Between the terminals L1 and N of the output to the connected electronics, a varistor is arranged within the common housing, which as fine protection compensates for possible differential voltages.

Furthermore, from DE 10 2005 063 443 A1 a communication center for receiving, processing and delivery of analog and or digital signals to form a communication system is known. To fulfill the most diverse communication and data acquisition tasks, to connect device modules in a standardized manner and also to take into account and integrate sensibly the interests of the most diverse types of antennas in the different fields of application, such as RFID, WLAN or space and propagation conditions for antenna arrays, several modules are arranged on or in the mast, which contain the functionally different communication devices. Several modules are always connected via a DC power supply unit to the power line of the mast and locked to the mast. In particular, the modules are connected to one another with a uniform electrical plug-in system so that the power supply for the modules is guaranteed and are connected to each other corded and/or cordless by a single bus system for analog signals and/or IP-based data. In addition, the communication center is connected via at least one communication device to the Internet. Lightning protection of the communication devices can be achieved by the fact that the mast and the cartridges contain metallic shielding elements and are earthed. Furthermore, the electrical contact elements, such as those of the modules or cartridges are provided with lightning protection cable grommets and overvoltage protection elements. The overvoltage protection for high overvoltages in fuses inserted in the power supply lines to the central communication unit and the overvoltage protection of the module (for small voltage ranges) extends the function of this zone lightning protection concept. The communication devices included in the modules may be radio antennas and/or amplifiers and/or rectifiers and/or assemblies for power generation and/or data processing devices, such as internet protocol processing devices. The data processing devices may be, for example, devices for data acquisition, for example for climate data acquisition, biometric data acquisition or transponder technology. The data processing devices may also be devices for data delivery, such as display and signaling technology, speaker systems or civil protection signaling technology. Modules for different applications are, for example, the module peripheral control, which has connection panels for providing connections of actuators, sensors and can be designed to optimize or adjust the lighting conditions in the street lighting, i.e. an interpretation for traffic light switching via short-range radio or infrared interface as from mobile phones, PDA's is conceivable. the terminal module has visual, mechanical and electronic input and output functions (keyboard, touch screen) and can include a fast charging station for mobile communication devices such as mobile phones, PDAs, wrist watches via mechanical-electrical contact or via electromagnetic contact; the Climate Data Collection module has sensors for the local collection and forwarding of climate data; the module biometry data with functional units for generation, acquisition, evaluation, forwarding of fingerprint, face, iris, display of mobile phones, PDA; the Routing and Data Traffic Optimization Module, which has isolation filters for the optimization of data traffic when used by the PLC as main assemblies and separates the powerline modem (PLC) data between the communication centers; the module for the authentication of users, billing and additional encryption of data in order to realize a passer-by toll or a ticketing, for which the software of a module evaluates the authentication information sent by a mobile phone (RFID or electronic signature) and sends the tariff information to an electronic passes payment system; a module for position determination and evaluation of GPS data of the terminals; a module remote monitoring, which includes a video camera including remote control and is responsible for detecting a break-in attempt in the communication center; a module Civil protection technology and Announcement technology, which includes amplifier technology for controlling sirens or loudspeakers and allows the coupling of announcement data, for example by means of voice-over-Internet Protocol (VOIP) -capable communication facilities, wherein the module for accessibility is assigned a separate Internet address and is for coupling of Announcement data from the mobile device, such as from the mobile phone.

Furthermore, from DE 296 02 914 U1 a circuit arrangement for electronic ballasts with an active harmonic filter for operating gas discharge lamps, which limits the inrush current and protects the electronic ballast from overvoltages is known. The essential circuit elements of the circuit arrangement are a field effect transistor serving for inrush current limiting and overvoltage protection and a bipolar transistor for driving the field effect transistor. The field effect transistor allows, in the conductive state via its through-connected source-drain path, a charging of an electrolytic capacitor of the circuit electronic harmonic filter connected to the output terminals of the circuit arrangement. In the locked state, the source-drain path of the field-effect transistor is interrupted and the output terminal is disconnected from the input terminal, so that the input capacitor of the harmonic filter is no longer charged. As a further circuit element, a heat-sensitive resistor between the source and drain terminal of the field effect transistor is connected, which protects the field effect transistor from short-term voltage spikes. For effective overvoltage protection, it is not necessary to dimension the field effect transistor with respect to the maximum occurring input voltage, since the output voltage of the circuit arrangement is always reduced by the drain-source breakdown voltage compared to the input voltage. In order to avoid the erroneous connection of the ballast between two phases, an additional overvoltage shutdown is arranged in the electronic ballast, for example in the electronic harmonic filter, which interrupts the operation of the inverter of the electronic ballast when the overvoltage protection circuit is activated, so that high power losses are avoided.

Furthermore, from DE 10 2009 031 967 B3 an adapter for compact fluorescent lamps or light emitting diode lamps with integrated ballast is known, which has a circuit arrangement for the suppression of conducted or field-bound electromagnetic interference. One side of the adapter housing is provided with a threaded socket and on the opposite side of the adapter housing a threaded socket with commercially available threads (for example E27 or E14 threads) is provided. To suppress line-bound and/or field-bound electromagnetic interference, the circuit arrangement of the adapter has two capacitors between the supply lines of the circuit arrangement. Chokes are arranged in the two supply lines between the capacitors, wherein these chokes may be provided individually in the lines or the chokes may have a common core. For example, to protect high-quality lamps against a mains-side overvoltage, a voltage-dependent resistor is connected in parallel with the capacitors between the lines. This is preferably a so-called varistor or VDR (Voltage Dependent Resistor), whose resistance decreases abruptly above a certain threshold voltage, so that the current flow is short circuited on the line side and the lamp screwed into the socket is protected against an overvoltage. Furthermore, the circuit arrangement of the adapter has for protection against overcurrent and/or excess temperatures in series with the in-line throttle on the line side a fuse, such as a fuse or a microfuse.

Furthermore, DE 10 2013 102 312 B3 discloses an operating circuit for operating a lighting module on a separate, external current or voltage source. The operating circuit has a load branch with a lighting module and a current limiting circuit connected in series with the lighting module. Parallel to the load branch a protective circuit with a voltage-controlled switch, such as an IGBT, which can accommodate large currents and is thermally highly resilient, is connected. A control voltage applied to the current limiting circuit serves as a control signal for the control input of the voltage-controlled switch. The current limiting circuit limits the load current through the light module. As the input voltage to the operating circuit increases, so does it the control voltage at the current limiting circuit. The module voltage at the light module remains essentially constant. When the control voltage reaches or exceeds a threshold, the controlled switch becomes conductive. The excess electrical energy stored in an energy-storing component of the power or voltage source to which the operating circuit is connected, can be degraded very quickly through the voltage-controlled switch, because unlike the load branch through the protection circuit, a large current can flow, which is not limited by the current limiting circuit.

Furthermore, DE 20 2004 020 723 U1 discloses a device for protection against overvoltages and for the automatic switching of an electrical device, which is arranged between a mains socket and the device. In this case, a lightning protection device is provided, which is connected on the one hand to the power outlet and on the other hand to a voltage converter, consisting of a transformer and of a rectifier circuit connected to the secondary winding of the transformer. Furthermore, the lightning protection device consists of a gas discharge sensor, two varistors and two fuses, wherein to the center tap lying between the phase conductor and return conductor of the operating circuit fuses of the gas discharge sensor are connected, which on the other hand is connected to the PE conductor (protective earth=protective conductor). Furthermore, a controller connected to the voltage converter is provided, which is connected to at least one input means for program and/or time control and at least one display means for operating status display and connected to the control device is a switching device, which is designed as a bistable relay. The control device is in connection with at least one sensor, in particular motion detector and the lightning protection device and takes in accordance with this the program/time-controlled switching on or off of the device from the power supply network. Furthermore, the lightning protection device may have a common LED display for the response of gas discharge sensor, varistors and fuses. For data transmission and/or communication via the power supply network or via a bus system or via an external line of a telecommunications or data network, an interface circuit with a communication module is connected to the voltage converter, which communicates with the control device. The control device can be controlled remotely from a remote control, for which the device has a receiver, in particular an infrared receiver.

Furthermore, intelligent grid thinking has been increasingly considered in recent years, particularly in order to reduce power consumption, whereby the smart grid offering the advantage of Demand Side Management (DMS) it should be possible to identify consumption forecasts and savings opportunities on the consumer side. With this information, users can align their consumption to the current generation situation by orienting themselves to dynamic tariffs. For example, EP 1 850 500 B1 of the Applicant discloses a data acquisition and control system with data transmission over radio links and electrical power distribution networks and methods therefor. In order to design the data acquisition and control system in the home area in such a way that allows both a combined collection of consumption data and the implementation of controls, this has:

at least one radio module connected to an antenna for connecting at least one remote module equipped with a radio transmitter and/or radio receiver of a device or a consumption meter via short distance radio, a control device connected to the radio module and having a program and data memory for temporarily storing the data supplied by the radio module, a communication module connected to the control device and a first coupling module connected thereto for transmitting the via power supply lines supplied data, and a communication gateway connected to the power supply lines via a communication module and a second coupling module connected thereto, which is arranged at the location of a summation current meter, so that the communication gateway together with the household power lines designed a backbone network for data transmission and the exchange of data between a plurality of remote modules or consumption meters, which are not within the radio range of the communication gateway takes place in combined radio/power-line operation with the communication gateway, and so that the communication system is universally applicable regardless of other technical conditions and offers the possibility for subsequent expansion.

The method according to EP 1 850 500 B1 of the applicant with radio data transmission between a radio module and at least one remote module further equipped with a radio transmitter and/or radio receiver of a device or a consumption meter, wherein the radio module having a control device, a communication module connected to the control device and a first coupling module, and equipped with power supply lines from a second coupling module to a communication gateway, which is arranged at the location of a sum electricity meter, is characterized in that:

for connecting the remote module or utility meter via short distance radio the radio module is used, the communication gateway performs a node function and transmits data from and to a central measuring or transfer point, in the household the communication gateway together with the power supply lines designs a backbone network for data transmission, the exchange of data between a plurality of remote modules or consumption meters, which are not within the radio range of the communication gateway, with the communication gateway takes place in the combined radio/powerline operation, and so that the communication system is universally applicable regardless of other technical conditions and the ability to offers subsequent expansion and the communication gateway provides an interface for additional value-added services in the area of multi-utility, security technology, home and facility management and automation technology, as well as home automation and energy control services.

The method according to the Applicant's EP 1 850 500 B1 has the advantage that this includes both central data acquisition and remote reading, i.e. allows harmonization of the services of all consumption quantities on economic terms, as well as an energy control on the basis of measured values/history. The data acquisition and control system according to EP 1 850 500 B1 of the applicant is based on powerline data transmission (existing infrastructure), so that meter readings are forwarded promptly via the power grid in the residential building to the centrally installed communication gateway and queried from there without human resources. In addition to the detection of the electrical consumption, the consumption data acquisition and energy control system according to the invention takes over the bundling of the communication of different measuring devices, i.e. counters of heat cost allocators, water meters, etc. via an integrated wireless solution. Read out and the action of the steps shown takes place from the respective gateway via WAN connections (GSM, GPRS, ISDN, etc.). An extension of the system to different broadband or telecommunication services is possible without changing the method according to the invention. Through a CPE (Customer Premises Equipment, a flexible IP integrated service gateway for broadband and embedded applications) gradually more internal (computers, phones, printers, video and TV equipment) and. external networking (VoiceOverIP, Internet) can be established.

Wireless networks such as Wireless Local Area Network (WLAN) or Wireless Personal Area Network (WPAN) have long been known. For data transmission between devices over a short distance by radio technology increasingly is used Bluetooth as an interface/wireless method, via which both small mobile devices such as mobile phones and PDAs, as well as computers and peripherals can communicate with each other. The main purpose of Bluetooth is to replace cable connections between devices. Devices according to the standards of the Bluetooth SIG (Special Interest Group) send as Short Range Devices (SRD) in a license-free ISM band (Industrial, Scientific and Medical Band) between 2.402 GHz and 2.480 GHz and can be operated worldwide license-free. To achieve robustness to interference, a frequency hopping spread spectrum (FHSS) is used, in which the frequency band is divided into 79 channels with a channel spacing of 1 MHz spacing and the information to be transmitted is successively distributed over many channels, i.e. only one frequency channel is used at a time. The adaptive frequency hopping method (AFH), since for example Bluetooth 1.2 is used, provides better protection against interference, whereby already used or disturbed frequency channels in the hopping sequence (temporarily) are avoided. At the lower and upper end there is a respective frequency band as a guard band to adjacent frequency ranges. Theoretically, a data transfer rate of 706.25 kbit/s can be achieved on reception with concurrent 57.6 kbit/s on transmission (asymmetric data transmission). The actual achievable range, which according to a power of 2.5 mW (class 2) lies in the building at about 10 m and outdoors at about 50 m, that depends in addition to the transmission power of a variety of parameters. These include, for example, the sensitivity of a receiver and the types of transmit and receive antennas used on radio communication links. Bluetooth data packets consist of a 72-bit access code, a 54-bit header and a variable payload data field from 0 bits to 2745 bits (packet type DH5) length. For Bluetooth 2.0+EDR, up to 8168 bits of user data per packet (3-DH5) are possible. The Bluetooth V4.0 Low Energy protocol enables connectionless operation in the send and in the receive direction. Standard 4.0 is not backwards compatible with all previous versions. An improved error correction is used for connections with the previous protocols, for the required level of security a 128-bit AES encryption is required. In December 2014, the Bluetooth 4.2 standard was introduced. The main focus during development was on enhanced security features, a higher transmission speed and an even more economical Bluetooth low energy mode. A connection can originate from any device that thereby raises itself to the "master" via the answering "slaves", whereby the receiver must start the same channels synchronously with the transmitter.

ZigBee is a specification for low-volume wireless networks, such as for example home automation, sensor networks, lighting technology. ZigBee is based on the IEEE 802.15.4 standard and extends its functionality, in particular the possibility of routing and secure key exchange, with the focus of ZigBee in short-range networks (10 to 100 meters). The ZigBee specification adds a layer of networking and application to the IEEE 802.15.4 standard. ZigBee-RF4C (Radio Frequency for Consumer Electronics) is another IEEE 802.15.4 standard-based specification that specifies simple and cost-effective wireless networks for controlling devices for example home entertainment and lighting control. In particular, to ensure the interoperability of products from different manufacturers, system requirements and devices are defined in so-called ZigBee profiles/clusters for a specific application. For example, in the profile ZigBee Light Link, which is used to control lighting technology of all kinds, is specified the control of color components, brightness and switching on and off of lamps. The communication in the cluster takes place according to the client/server principle and is always encrypted by a network key. This is communicated encrypted to a radio module joining the network by the so-called master key. As a block encryption algorithm, AES-128 is used. The profile ZigBee Home Automation is used for the general control of devices in smaller buildings and can also be used to control lighting technology. The transmission is also encrypted by a network key. Again, the network key is communicated encrypted by a master key when entering a terminal (ZigBee End Device, ZED) in the network. For this purpose, the terminal, for example a radio module (which has a unique 64-bit IEEE address) logs on to a router of his choice, which assigns a 16-bit short address. Routing in the network takes place either along a tree thus formed (stack profile ZigBee) or through dynamic routing as a mesh network (stack profile ZigBee PRO).

Furthermore, PLC- (PowerLine communication) systems as message transmission systems (carrier frequency system), which distribute the information on the medium energy cable, have long been known. In particular, the transmission distance between the transformer station in the low-voltage network and the customer system in the house is of importance here. The topology of this network section usually has a point-to-multipoint structure with the transformer station as a node. At this node, for example, a transceiver can be arranged, which feeds high-frequency signals up to 30 MHz separately in the outgoing cable and superimposed on the 50 Hz energy flow. Further transceiver units may be located at the customer facility at the interface between the low voltage distribution network of the utility company and the home installation network of the customer facility. High-frequency signals are also fed into the power cable and received here. Setting up a powerline network as a home network is easy and quick for the user. For this purpose, Powerline adapter (adapter) are provided, which are inserted by the user in the respective existing outlet of the house installation. With the help of already in other transmission methods (e.g. xDSL or WLAN) used orthogonal frequency-division multiplexing (OFDM) on the transmitting side in each case a plurality of signals is modulated simultaneously in phase and amplitude on a carrier frequency (frequency multiplexing). The available frequency spectrum depending on the transmission standard is thereby divided into channels to reduce the susceptibility or to allow appropriate countermeasures (error correction and interleaving). The modulated data is then sent via the power line to the receiver where it is bandpassed again separated from the carrier frequencies (demodulated). Most PowerLAN standards operate in the high frequency range between 2 MHz and 68 MHz. Powerline networks in the private-sector typically have a peer-to-peer network topology, i.e. each adapter communicates on an equal basis with each other, without any special hierarchy. An attack of the powerline network is only possible via the direct access to the mains, that is via a socket in the house or apartment, in addition to an intruder then also must analyze and decrypt the encryption (AES 128 bits). The range is, in addition to the transmitting power of the adapter, significantly dependent on the quality of the power lines in the house or apartment. There are also devices, or "sources of interference", within the power grid, such as refrigerators or other electrical appliances, which have an electric motor, which ensures interference in the power grid. The range is also limited by the electricity meter. The attenuation of the signal is so great that in addition a transmission is often not possible or only very weak. The data rate for currently available powerline adapters is approx. 1.000 MBit/s. For the supply of tablets (i.e. a portable, flat computer in a particularly light version with a touchscreen (on-screen keyboard)) or smartphones (a mobile phone, colloquially named handy) having a touch-sensitive screen, on which both standard web pages and mobile optimized web pages can be displayed, having extensive computer functionalities including digital and video camera and GPS navigation device and connection to the Internet, optionally via a mobile broadband connection via the mobile operator or via WLAN and an Internet download portal (an "App Store") for downloading additional programs ("Apps"), powerline adapters with integrated WLAN access point can also be used. The message transmission via radio to the powerline adapter then takes place via power line to the modem (usually DSL modem) and from this to the Internet.

Another home networking technology is G.hn (HomeGrid standard), which provides digital networking over power, telephone and cable television cables at data rates up to 1 Gbps. G.9955 is a supplementary standard that specifies a simplified, narrowband variant for smart grids (i.e., the communicative networking and control of power generators, storage, electrical loads and network resources in power transmission and distribution grids) and home automation applications. G.hn is a carrier frequency method that operates at a (gross) signal rate of one gigabit per second. There are several partial data streams modulated by means of orthogonal frequency division multiplexing (OFDM) on several carriers and sent over the medium. The subcarriers are each modulated with Quadrature Amplitude Modulation (QAM) up to 4096-QAM (12-bit QAM).

Networks based on completely different network protocols can be interconnected via a gateway. The entire gateway, for example in telecommunications (digital voice, audio or image information), which allows the interconnection of different types of networks, is composed for the digital transcoding of different media (for example language) by the Media Gateway, the Media Gateway Controller and the Signaling Gateway.

For example, US 2014/0300293 A1 discloses an LED lighting device and an LED lighting network system having two or more LED lighting devices. To overcome network problems in wireless lighting networks caused by obstacles in the detection area and by limited transmission range, the LED lighting device comprises an LED lighting unit, an LED driver circuit, a control unit (controller) and a Wi-Fi module (wireless fidelity, by the WiFi Alliance based on the IEEE standards for Wi-Fi certified devices) configured to send and receive Wi-Fi signals. The Wi-Fi module may be integrated inside the LED lighting device on the same circuit board containing the LED driver circuit. Furthermore, the Wi-Fi module having, for signals in the frequency range of 2.4 GHz or 5 GHz, an external antenna or an internally integrated antenna, which may be integrated with the Wi-Fi module and can be arranged on the same circuit board. The controller is in communication with the Wi-Fi module and the driver circuit, which in turn is connected to the LED lighting unit, and can monitor the LED light operating conditions, such as whether the LED lighting device is on or off, or make light intensity measurements. Each LED lighting device can act as a gateway, network access point, or repeater. The LED lighting devices may form a network or an ad hoc network connected to a local area network or the Internet. This allows the user to remotely monitor and control the LED lighting devices. As a remote terminal that monitors and controls the status of each LED lighting device of the LED lighting network system, the user can use a computer, a tablet or a smartphone. For example, a smart phone (with the right program/app) can be used to remotely control switching the LED lights on/off, or adjusting the light intensity, light color, etc. This allows users, for example, to control the lighting of large buildings—such as office buildings or shopping centers. Furthermore, in some embodiments, various sensors may be attached to an LED lighting device to measure other parameters. For example, to measure the light intensity, sensors may be placed on the LED lighting device, or humidity or temperature sensors may be placed in the LED lighting device to measure humidity and temperature. The measurement data from various sensors can be transmitted through the Wi-Fi signals and retrieved at a control terminal connected to the LED lighting device. The controller may control the LED lighting devices based on the measurements from the sensors (e.g. to reduce light intensity when the measured operating temperature is too high). Furthermore, users can surf the Internet or network and download data using such a wireless access point. In some embodiments, an LED lighting device having a display unit may be used to indicate various parameters such as LED network connectivity, power consumption, life, light intensity, and so forth. For example, the LED lighting network display unit may indicate by means of flags whether each LED lighting device is actively connected to the Wi-Fi network. The operator terminal can also be used to display information from the controller, such as an alarm message, an alarm, a display, etc.

A similar remote control system for intelligent terminals, in particular a smart lamp with power supply, wireless microcontroller, LED driver chip and LEDs, is known from CN 204291046-U. For remote control of the intelligent lamps, they can communicate with intelligent terminals, such as PDAs, smartphones or tablets, via a Bluetooth gateway or Zigbee gateway or an Ethernet controller chip located in the gateway and a cloud server. For remote monitoring and flexible adaptation, in particular to achieve low power consumption, the relevant data supplied by means of the intelligent lamps are collected, transmitted to the cloud server and finally transmitted via the Internet to the PDA, smartphone or tablet.

Furthermore, U.S. Pat. No. 7,079,808 B2 discloses an adapter part arranged between a lamp socket and a light bulb, for example a ceiling light, having a wireless repeater and control unit. The adapter part has on one side a longitudinally extending threaded portion having on the outside the screw thread for the lamp socket and on the opposite side a threaded portion arranged on the inside for a light bulb. In this way, a wireless repeater can be installed very quickly and without tools anywhere, such as a light bulb/light bulb. When the light switch, which would normally control the light bulb, is turned on, the power of the wireless repeater and the control unit will be turned on. When the WLAN repeater and the control unit receive a radio signal, in particular according to the Bluetooth wireless specification, it sends out the received radio signal with predetermined amplitude. For switching on and off, the radio control signals received by the WLAN repeater and control unit are evaluated. As a result, the WLAN repeater and control unit can be used both for radio range extension and for radio remote control of the light.

Furthermore, DE 10 2011 007 416 A1 discloses a lamp with an adapter or such an adapter for controlling the lamp, in particular for controlling the lighting, such as dimmable fluorescent lights, from large buildings in the commercial sector, wherein in the adapter a radio Network module, in particular a WLAN- or WPAN-module for wireless communication via an integrated or externally connected radio antenna is embedded. For luminaire control, the adapter comprises an arithmetic unit embedded in the adapter, for example a microprocessor programmed for this purpose. To provide an interface to DALI-compatible operating devices, the arithmetic unit is programmed in particular according to DALI (Digital Addressable Lighting Interface). Furthermore, the adapter comprises an integrated server for providing a user interface via radio. The electrical control is carried out via the DALI bus by means of an electrical connection, which is provided for this purpose in the adapter. The arithmetic unit and the server are programmed in such a way that the luminaire can be remote-controlled by means of the user interface, for example by means of a WLAN or WPAN-enabled smartphone. The server is designed here as a software component and can be implemented, for example, by the computing unit. The server can also be realized by a radio network module, which may be physically separated from the arithmetic unit. The solution described in DE 10 2011 007 416 A1 is thus essentially a "wireless network-to-luminaire interface" adapter, which enables direct and simple activation, for example via WLAN (Wireless Local Area Network) and DALI. Especially with adapters with WLAN according to IEEE 802.11 or WiFi (i.e. by the WiFi Alliance based on the IEEE standards for WLAN certified devices), the light can be operated by any standard wireless-enabled device, such for example a so-called smartphone (mobile phone with additional functions). Instead of WLAN, other common standards are possible, for example WPAN (Wireless Personal Area Network), in particular according to IEEE 802.15 or Bluetooth. In addition to a common radio interface, the adapter comprises a DALI control unit and, connected thereto, a server provides a user interface which uses a standardized protocol for WLAN, for example HTTP, or via an application developed for the adapter, for example an APP (application) for the desired smartphone. The user interface is independent of the terminal and thus accessible via any standard device with Internet browser. The adapter is also suitable for installation directly in luminaire housing, such as a pendant or a floor lamp, which can be guaranteed even at low power inherently good wireless signal strength. Through the adapter you can control lights directly and easily, for example, with a smartphone or a netbook. A significant advantage is therefore in the use of today ubiquitous existing portable WLAN-enabled devices for lighting control, especially smartphones or netbooks. This eliminates the need for special or additional radio remote controls. In addition, several and different users can operate the desired light with their own device or, for example, configure as desired. In a preferred embodiment, the adapter comprises a radio network module which is designed as a WLAN-module, preferably as a WLAN access-point in accordance with the IEEE 802.11 standard. In this embodiment, the server is preferably designed for communication with an Internet browser, in particular as an HTTP web server. In another preferred embodiment, the radio network module is embodied as a WPAN module, preferably as a so-called Bluetooth module, in particular as a Bluetooth access-point in accordance with the IEEE 802.15 standard. In this embodiment, the server is preferably equipped for communication with an adapter-specific programmed application, in particular a smartphone application (APP). Despite a shorter range compared to WLAN-modules, a WPAN-module is particularly suitable for a cost-saving design, also in conjunction with a manufacturer-specific and smartphone-suitable application (APP). In addition to the electrical connections suitable for the DALI bus, the adapter according to the invention preferably comprises a connection terminal with connections for further electrical devices, in particular pushbuttons and/or sensors for controlling the luminaire, or else for supplying power to the adapter and its modules. In an embodiment of the adapter with a sensor connection, the arithmetic unit is programmed so that a control value for the brightness control of the luminaire is calculated. The calculation can be based on measured values, i.e. determined by an external light sensor actual values, and made by the user interface predetermined target values. The arithmetic unit then outputs the calculated manipulated variable via the automation interface as a control command to the luminaire In a further preferred embodiment, the arithmetic unit is programmed both for luminaire control according to the data interface and for providing the server, for example an HTTP-web server or an HPP-server.

By contrast, the server can also be integrated in the actual radio network module. As a result, corresponding, already commercially available components can be used. A particular advantage of the adapter is that it can be easily integrated into the luminaire housing of a luminaire. For this purpose, the adapter preferably has an adapter housing with relatively small dimensions, so that wireless network modules with a short range can be easily controlled. The adapter can be used in an interior light, such as a suspended, ceiling recessed, ceiling mounted, wall mounted or recessed wall luminaire or in an outdoor light. Regardless of the type of luminaire, it is possible with the adapter to control lights directly and simply with a smartphone or a notebook or similar devices. Thus, for example, HTML- and/or HPP-based lighting controls for portable devices can be offered in a cost effective manner Due to the widespread use of smartphones, netbooks or notebooks, the use of specially manufactured radio remote controls is unnecessary. Remote maintenance via Internet, i.e. a central control of several adapters allows host software by means of direct addressing of the individual adapters or their DALI addresses. If the server is suitable, the use of IP-sensors and IP-interfaces (e.g. control panels, remote controls, websites, software, . . . ) is possible.

Furthermore, DE 10 2012 109 829 A1 discloses a method and a device for controlling street lamps with a mobile terminal and a gateway, in which event information indicating that a predetermined event has occurred at the street lamp and a notification information, indicating that the event information has been received is displayed to a user of the mobile terminal in real time. The mobile terminal may be, for example, an electronic device carried by a user, such as a mobile phone, a smartphone, a personal digital assistant (PDA), a netbook, a notebook, a portable device, or the like. The gateway can forward a data transmission, in particular of the received data, between the mobile terminal and the plurality of street lamps. For this purpose, the gateway has a plurality of sub-gateways and a main gateway for managing the sub-gateways. In this case, the sub-gateways are each connected to a plurality of street lamps and the gateway/main gateway is in connection with the mobile terminal via a wired/wireless network, i.e. the Internet, a local area network (LAN), a wireless local area network (WAN), a wide area network (WAN), a personal area network (PAN) or the like using a communication module located in each of the mobile terminals and the gateway. The user of the mobile terminal can check whether a predetermined event occurs in a particular street lamp, for example, in the first street lamp in real time by referring to the notification information provided in real time using the user interface unit. In this case, the user may input control information for controlling the first street lamp to the first user interface. The control instruction may be, for example, an instruction to perform at least one diagnostic operation of the first street lamp, a process of turning on/off the first street lamp, a process of dimming the first street lamp, and a process of returning the first street lamp to a predetermined initial state. For example, the user interface unit may display a map on which information relating to the position of at least one street lamp among the plurality of street lamps is displayed in accordance with an input by the user. In this case, the user interface unit may map the information regarding the position of at least one street lamp among the plurality of street lamps on a card embedded in the mobile terminal or on a map provided via the Internet. In this case, the card provided via the Internet may be a card provided by an Internet service provider such as Google, Naver, Yahoo, or the like. In addition, when the mobile terminal has a GPS (Global Positioning System) receiver, status information regarding areas adjacent to the mobile terminal or with respect to street lamps positioned adjacent to the mobile terminal can be checked.

Furthermore, from DE 10 2006 037 803 A1 a built-in antenna for a wireless/portable communication terminal, such as a personal communication service terminal (PCS=Personal Communication Services), a PDA (=Personal Digital Assistant), a smartphone, a communication terminal of the next Generation (IMT-2000), a wireless local area network (LAN) terminal is known. In order to provide an antenna module which uses a limited space in a terminal body to achieve miniaturization and obtain high reception sensitivity RF characteristics, an antenna module incorporated in the communication terminal has at least a first radiator for a base station and at least one second radiator for Bluetooth. Specifically, a socket is provided with the first and second radiators mounted on an outer surface thereof, the socket being mounted on a board such that each end of the first and second radiators is electrically connected to the board of the terminal body. Furthermore, a Bluetooth chipset is provided, which is attached to the base and is electrically connected to the second radiator. The first radiator (transmit/frequency band approximately in the 800 MHz range or in the 1800 MHz range) and second radiator (transmit/receive frequency band in the 2.4 GHz range) are configured as a planar antenna, in particular as an antenna trace, which printed on an outer surface of the base. The first radiator has at least one transmitting/receiving terminal at its one end, the transmitting/receiving terminal having a lower free end in contact with and electrically connected to a connecting pad of the board. The second radiator has at its one end at least one transmission/reception port with a lower free end in contact with and electrically connected to a connection pad of the Bluetooth-chipset. Each of the lower free ends of the transceiver ports is bent to hold resilient contact with the connection pad. The Bluetooth-chipset includes a flexible circuit board having chip components such as a wireless circuit, a baseband signal processor, a main processor, an SRAM, and a flash device mounted on a surface thereof These chip components are covered by a protective cover which protects the chip components from environmental influences or harmful electromagnetic radiation.

Finally, from US 2015/0342006 A1 a bidirectional illumination system with at least one light bulb is known, which comprises a plurality of light-emitting elements, a diffuser and sensors on the front side in the emission direction. The diffuser preferably encapsulates the sensors (for example an ambient light sensor) within the light bulb. On a substrate, the light-emitting elements are mounted in fixed predetermined positions and a plurality of sensors, in particular light sensors. Furthermore, at least one wireless communication module (which supports one or more communication protocols) is provided with an antenna for communicating with an external device and a processor disposed in the light bulb (Microprocessor, CPU). The processor is for determining the spatial orientation for the light bulb, identifying the respective light-emitting element, detecting a context event, allocating and storing a spatial one light pattern and a time stamp (RAM, ROM, flash memory, EEPROM, CD (Compact Disc), DVD (Digital Versatile Disc), hard disk, floppy disk drive) to the contextual event and to selectively control the light-emitting elements. The light emitting elements may be LEDs (Light Emitting Diodes), OLEDs (Organic Light Emitting Diodes), PLEDs (Polymer LED), Solid State Lighting, LECs (Light Emitting Electrochemical Cell), Lasers, bioluminescent Illumination, chemiluminescent lighting, fluorescent lamps, gas discharge tubes, phosphorescent light, ESL lighting (energy saving lamp or compact fluorescent lamp), incandescent lamp or any other light source. The light-emitting elements may be arranged in concentric rings (e.g., circles, rectangles) or in a spiral (e.g., circular spiral, logarithmic spiral, square spiral). The emitted light can be visible (e.g. red, green and blue) or invisible (for example, infrared light). The communication protocol can be for example WiFi, ZigBee, Z-Wave (radio frequencies between 850 and 950 MHz), wireless USB, NFC, Bluetooth or for wired communication Powerline, Ethernet and others. The sensors may, for example, light sensors for detecting the ambient light (for example photometers, photodiodes, photoresistors, phototransistors), image sensors or cameras (e.g. CCD-cameras, CMOS-cameras, etc.), optical detectors; positioning sensors of a positioning system (for example GPS), orientation sensors (accelerometer, gyroscope, digital compass), current sensors, sound sensors (microphone) or any other sensor. The external device may be a mobile device (e g smartphone, tablet) or a light sensor or a camera of the device or a second light bulb. Thus, it is possible make at any time a review and setting (at the geographical position of the desired illumination target, control of a variety of light parameters, in particular light direction adjustment by selectively operating the light-emitting elements or movable actuating mechanism for a movable lighting fixture or pivotal support or rotatable light bulb/group of light emitting elements) of the spatial light pattern of the lighting system, preferably with a mobile device. Measures to protect the lighting system against over or interference voltages are not addressed in US 2015/0342006 A1.

As the above assessment of the prior art shows, control gear for the protection of devices connected to power lines, lamps or the likes against overvoltage or interference voltages or of devices for reducing the consumption of electrical equipment, lights or the likes are known for various applications and embodiments. The main disadvantage of the above-described prior art is that in the past always separate measures are taken to on the one hand the overvoltage protection device, on the other hand, to the control, for example, to communicate, consumption reduction or the likes to realize as part of the house installation. Also missing in practice is a universally applicable operating device, which allows also an untrained user a simple assembly or installation and safe operation in the context of house installation of residential buildings or buildings with similar purposes (shops, medical practices, small commercial premises, etc.). In particular, when using a portable communication terminal, the antenna structure with respect to usable bandwidth and directional diagram is of great importance.

The future of energy supply belongs to the "intelligent" networks, the so-called Smart Grids in connection with components and services in the so-called Internet of Things (IoT) or in the area of Industry 4.0.

In the field of energy supply, these are systems that, with the help of information and communication technology available today, interconnect the different generators with electricity storage, transmission and distribution networks and energy consumers. This has the advantage that the primary energy can be used more efficiently for power generation. With the Smart Grids, where everything is connected with everything, there are completely new possibilities of mutual flexible, active adaptation of power generation, grid management and consumption.

The Internet of Things IoT refers to the connection of unique identifiable physical objects with a virtual representation in an Internet-like structure, where many real things provide their own state information for further processing in the network. Such state information may be information about the current usage, about aging, but also about particular environmental conditions at the subscriber's location. Such information can be evaluated both to improve the usability of the subscriber itself (early detection of maintenance or replacement, etc.), as well as to improve the situation of the surrounding area (such as for example, the reduction of energy expenditure for heating or cooling can be tied to a multitude of information throughout the room, and thus work better than in the standard installation, which has to make do with a single sensor [often mounted in an unsuitable place]). In a further step, digital services as part of the IoT can facilitate and improve the parameterization of devices so that they also happen where they do not take place today for cost reasons. In addition to the building automation in the object area, the networking and control of devices and parts of the building technology in the living area, according to the concept Intelligent Living or smart home (also called intelligent house, networked home, home control, home automation or smart living) will be done in the future. The automation technology for manufacturing technology and logistics required for Industry 4.0 is to become more intelligent through the introduction of self-optimization, self-configuration, self-diagnosis and cognition methods, and to better support people in their increasingly complex work. In the living area, the term Intelligent Living stands for the data networking and control (also remote control) of electrical equipment, lighting, consumer electronics, heating, ventilation and others, with regard to energy consumption, the functions particularly useful if they are using the so-called Smart Grids). The same applies to the "smart factory" or computer-integrated manufacturing. The goal of the concepts is:

the comfort (for example timely turn on the heater) and safety, energy efficiency (for example timely shutdown of the heater or kitchen devices), to improve efficiency and to better match the generation and supply of electricity and the demand thereto.

However, it can be stated that there is still a lack of concrete implementation of the concepts, in particular:

the standardization of the components and services in the Internet of Things IoT or in manufacturing technology IIOT.

the introduction of an easily accessible, secure and general network connection, suitable for all devices with built-in microcontroller.

the reduction of costs for participants integrated into the IoT (equipment costs, commissioning costs, connection costs etc.).

development of low-cost, automated (even autonomous) digital services in the network, which realize the additional benefits of networking.

This is particularly important because both the relevant industries, in particular the entertainment, computing, telecommunications and engineering industries, are considered to be highly advanced, development-friendly industries that are quick to pick up on improvements and simplifications and put them into realization.

The invention has for its object to design a universally applicable, flexible and highly integrated control gear for the control of various bulbs such that on the one hand bulbs for example LED, HQI, NDL, etc. are supported and on the other hand this can be operated in different performance classes with high efficiency. Furthermore, the operating device should independently control, regulate and monitor connected bulbs, a reliable protection against overcurrent and overvoltage, in particular of the connected devices should be achieved and it is also to enable an untrained user safe operation and operation, especially a simple adaptation to the needs. Also, for use, especially for BLE-communication, the 3D-directional diagram of an antenna integrated in the operating device should be as spherical as possible, i.e. as far as avoidable no room areas with bad transmission should arise and the antenna should have a sufficient usable bandwidth.

This object is achieved by a control gear having the features in the preamble of claim 1, characterized in that with the coarse protection, which short-circuits the mains voltage occurring at the input of the operating device, both a first branch for connecting a luminous means to a first of the interface circuits and a second branch for connecting at least one communication module to a second of the interface circuits are connected, that in the first branch with the coarse protection, a line filter is connected, which delays, reduces and folds the overvoltage pulse limited by the coarse protection for the subsequent circuit parts and reduces the slew rate, that with the line filter, a clamping circuit consisting of the fine protection and a first energy absorber, is connected, wherein at too high residual voltage of the pulse, the fine protection activates the first energy absorber and a short circuit of the overvoltage pulse is done and upon reaching the next zero crossing of the mains voltage, the short circuit again is deactivated, that with the first energy absorber, a second energy absorber is connected, which limits the current when switched by means of a temperature-dependent resistor and that to protect the output side interface circuit of the operating device against overvoltages and overcurrent, which act on the operating device from the light source, the first interface circuit has an overvoltage and overcurrent protection and that in the second branch with the coarse protection a middle protection, consisting of a transformer and a first fine protection circuit is connected, wherein the transformer goes into saturation during the overvoltage pulse, that with the first fine protection circuit a filter for the separation of parallel communication signals fed to the power supply network and with this filter a second fine protection circuit is connected and that to protect the second interface circuit of the operating device against overvoltages and overcurrent, that act from the communication module to the operating device, the second interface circuit has an overvoltage and overcurrent protection, whereby a protection of the entire operating device and the downstream devices is ensured by the staggered protective measures from the input and output.

The operating device/ballast according to the invention has the advantage that in a surprisingly simple manner by the staggered protective measures an effective protection of the entire ballast including connected light sources and devices is guaranteed. The operation of the protective devices is dimensioned so that the respective devices effectively protect from primary and secondary all subsequent circuit parts.

Furthermore, this object is achieved by a light source with an operating device, according to claim 11, having an integrated gateway between wireless and wired networks for controlling or networking of devices, characterized in that the lamp consists of an upper lamp part with light emitting diodes and designed as a device base with terminal base lower lamp part, that the connection socket is designed as a screw thread-ring contact and foot contact and that in this the electronics of the operating device for both the light-emitting diode drive, as well as for the powerline communication PLC and Bluetooth low energy BLE-communication is arranged.

According to a development, starting from an operating device according to claim 1 or lighting means according to claim 11 with an antenna, wherein according to claim 12, the antenna as an angled dipole with at least one structural element, which extended the antenna in the 3rd Dimension.

The operating device/ballast according to the invention has the advantage that in a surprisingly simple manner by the staggered protective measures an effective protection of the entire ballast including connected light sources and devices is guaranteed. The operation of the protective devices is so dimensioned that the respective devices effectively protect all subsequent circuit parts of primary and secondary.

Furthermore, this object based on an operating device for a smart lamp with integrated gateway between wireless and wired networks for controlling or networking of devices, according to claim 11, is solved in that the lamp consists of an upper lamp part with light-emitting diodes and designed as a device base with terminal base lower lamp part, that the terminal base is designed as a screw-threaded ring contact and foot contact and in this the electronics of the operating device is arranged both for the light-emitting diode drive, as well as for the PLC and BLE communication.

The operating device according to the invention has the advantage that in a surprisingly simple manner, a universally applicable device can be constructed inexpensively, which allows both protection against overvoltages and automatic switching of electrical equipment and bulbs and which can be operated in a reliable manner In particular, this allows the consumer a simple installation (replacement of the bulb) and this can realize price advantages without sacrificing comfort by having devices that work automatically preferably during low tariff periods, such as heat pumps with latent heat storage, freezer, electric boiler, washing or dishwasher. By using the operating device according to the invention modern systems can work more flexible and intelligent, which is particularly important for the inclusion of renewable energy. For example, the specific switch-on time of an intelligent refrigerator can be shifted in a certain time interval in such a way that it more closely matches the supply of electrical power without the refrigerated food being heated excessively. The lightning protection device integrated in the operating device/intelligent lamp according to the invention has the advantage that a stepped coarse/fine protection is made possible.

In a preferred embodiment of the invention, according to claim 2, the coarse protection has a gas arrester and in series with the gas arrester two varistors and that for thermal coupling a thermal fuse is placed very close to the varistors, so that at the end of life of the varistors the increased leakage current flowing through it is detected.

In contrast to an electrical fuse, the triggering of the thermal fuse according to the invention is not primarily influenced by the current flowing through it, but by its temperature. Preferably, the thermal fuse according to the invention is a combination of thermal fuse and overcurrent switch realized on the output side with a PTC resistor (Positive Temperature Coefficient, PTC thermistor).

Preferably, according to claim 10, for controlling the operating device, for querying status messages of the operating device, for initializing the parameters of a lighting device and for updating the firmware of the operating device, the operating device comprises at least a powerline communication interface and the operating device operates between the individual communication interfaces as a gateway.

Figure 2:
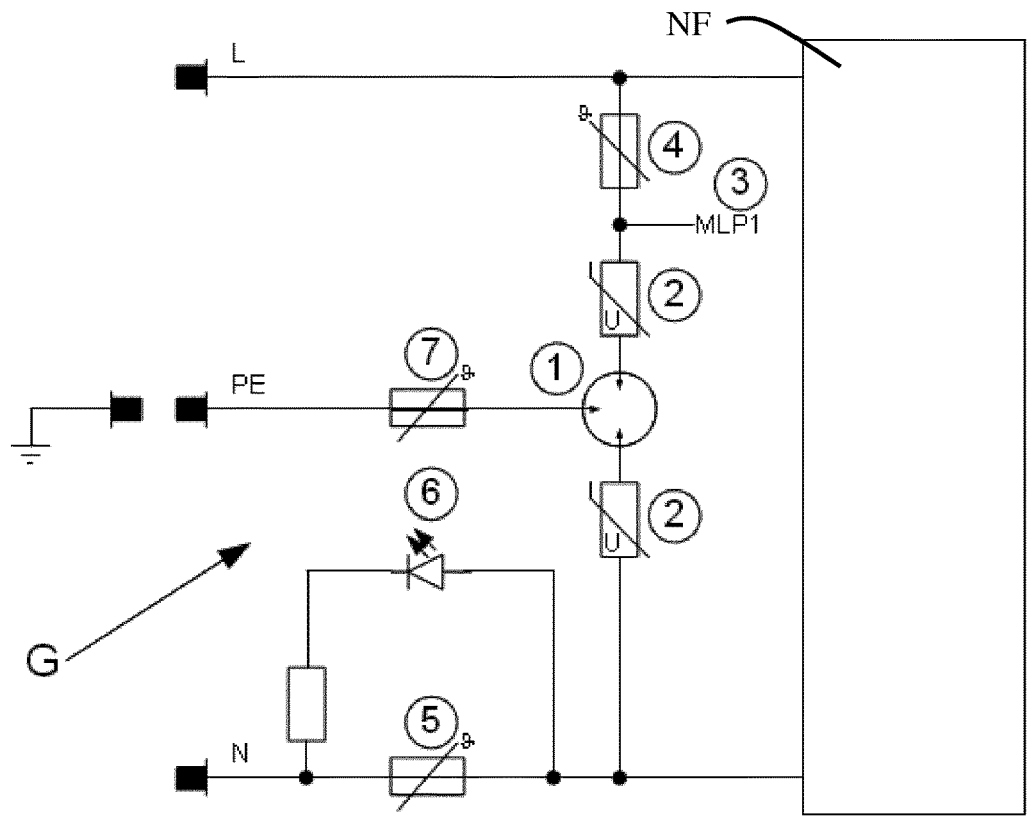
Figure 3:
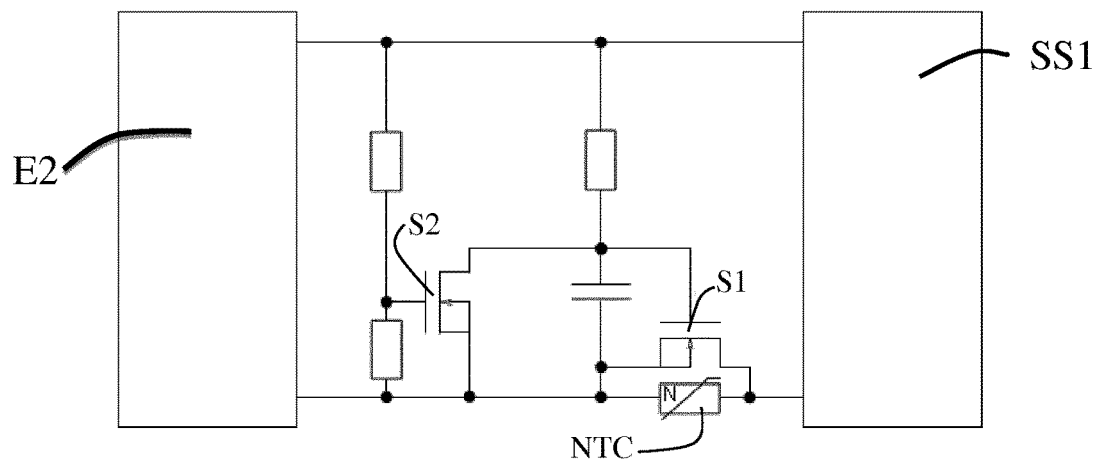
Figure 4:
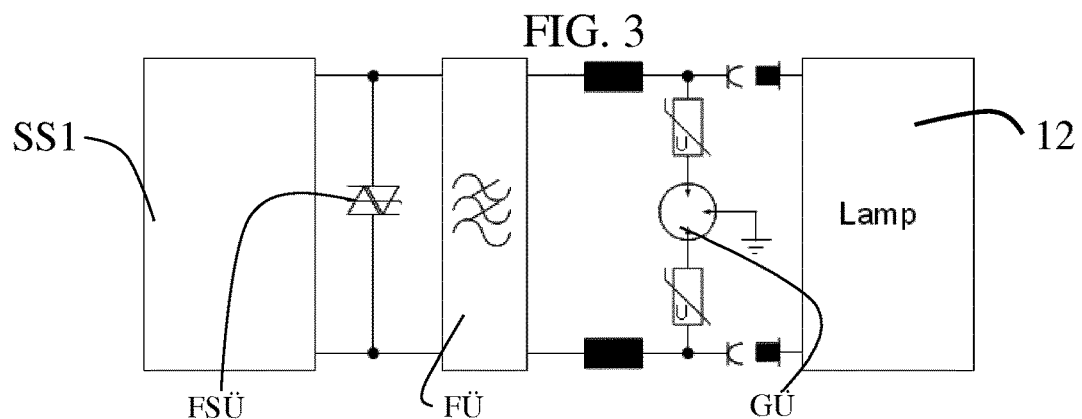
Figure 5A:
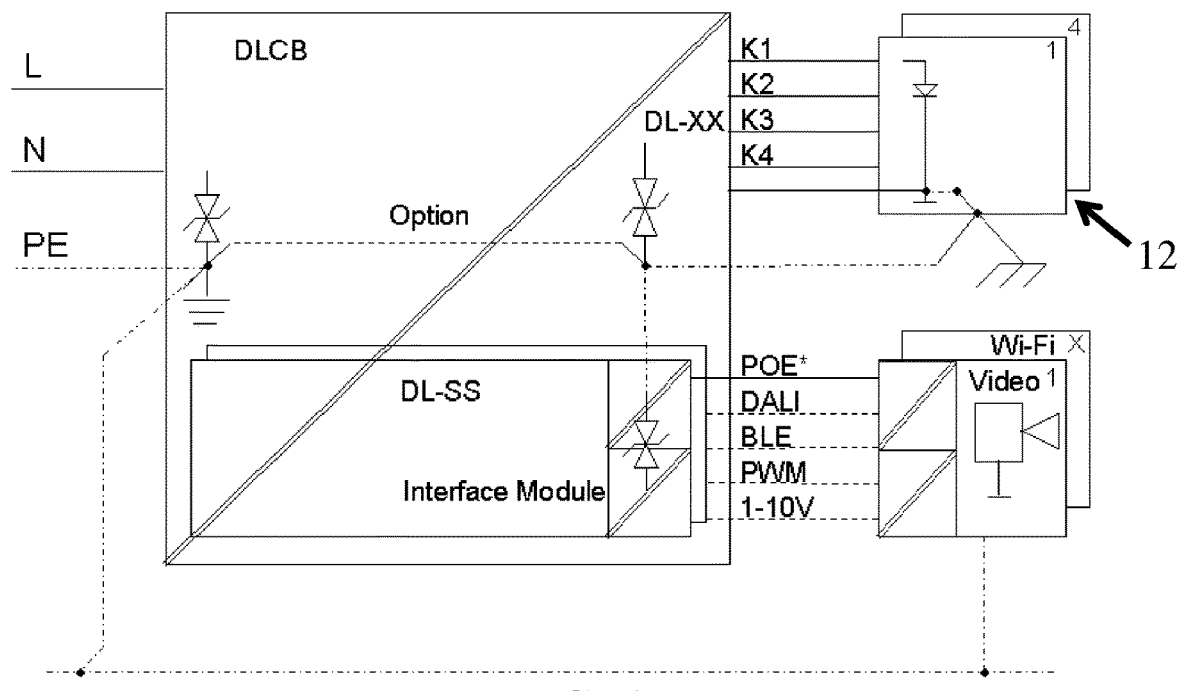
Figure 5B:
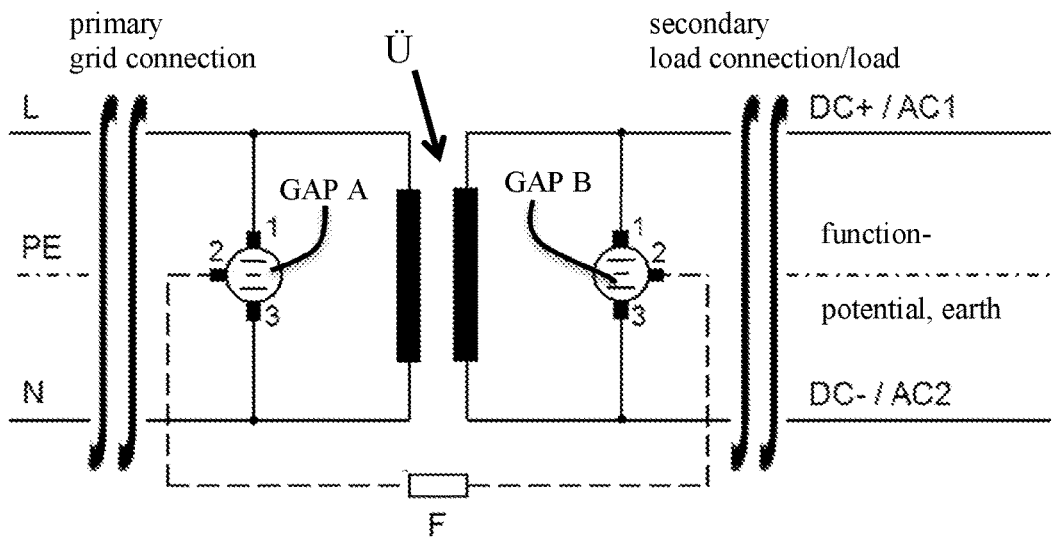
Figure 6:
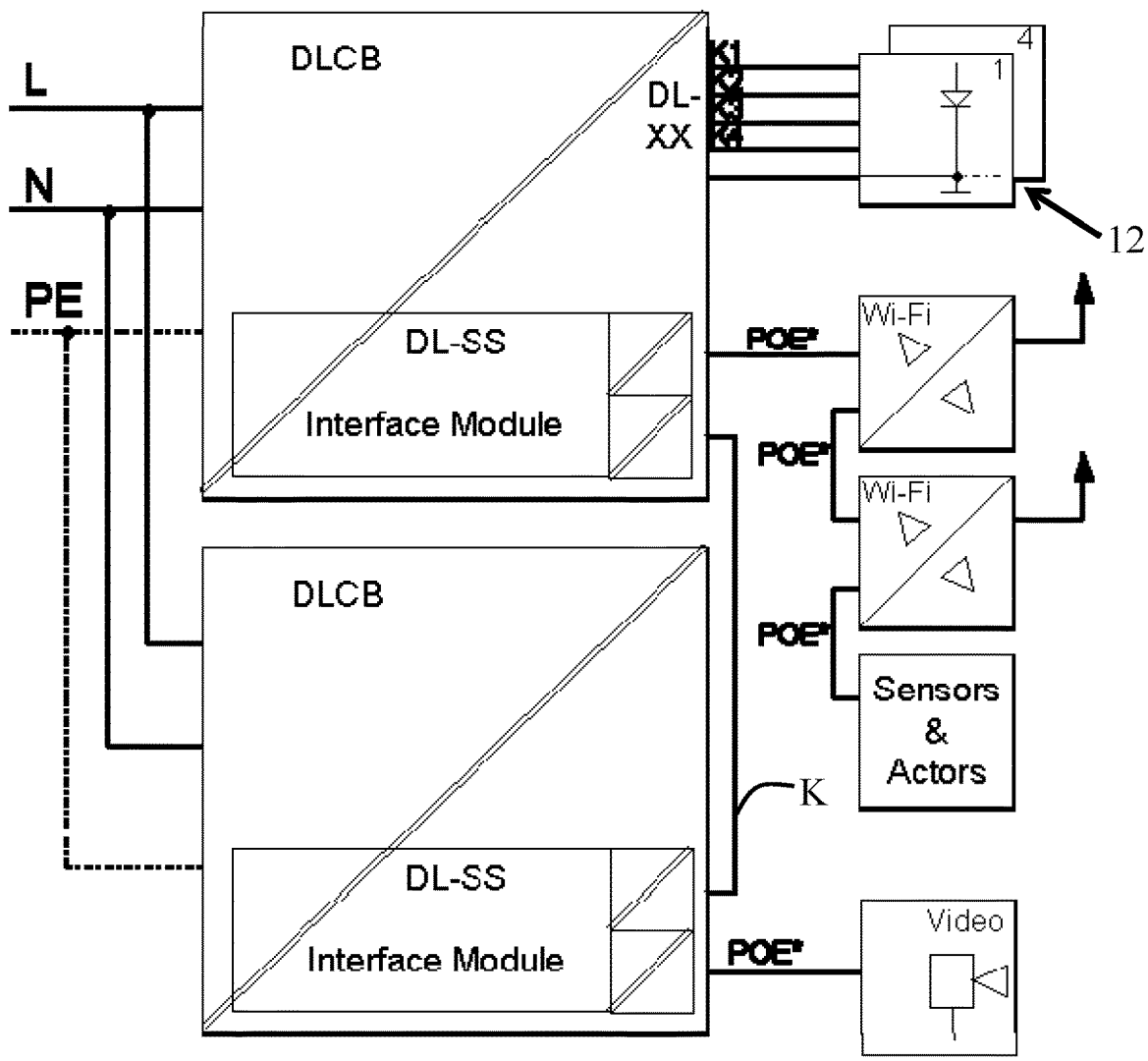
Figure 7:
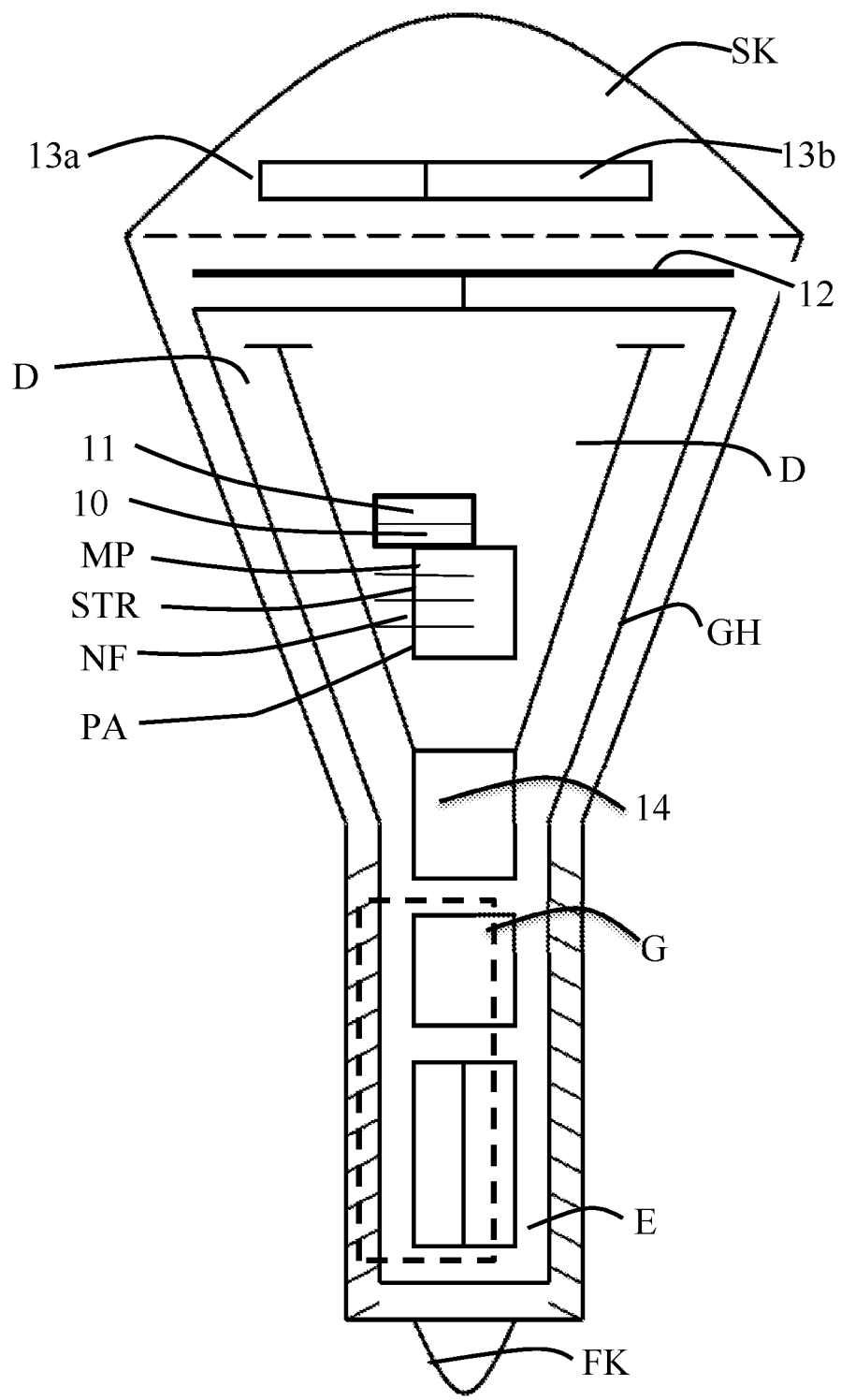
Figure 8:
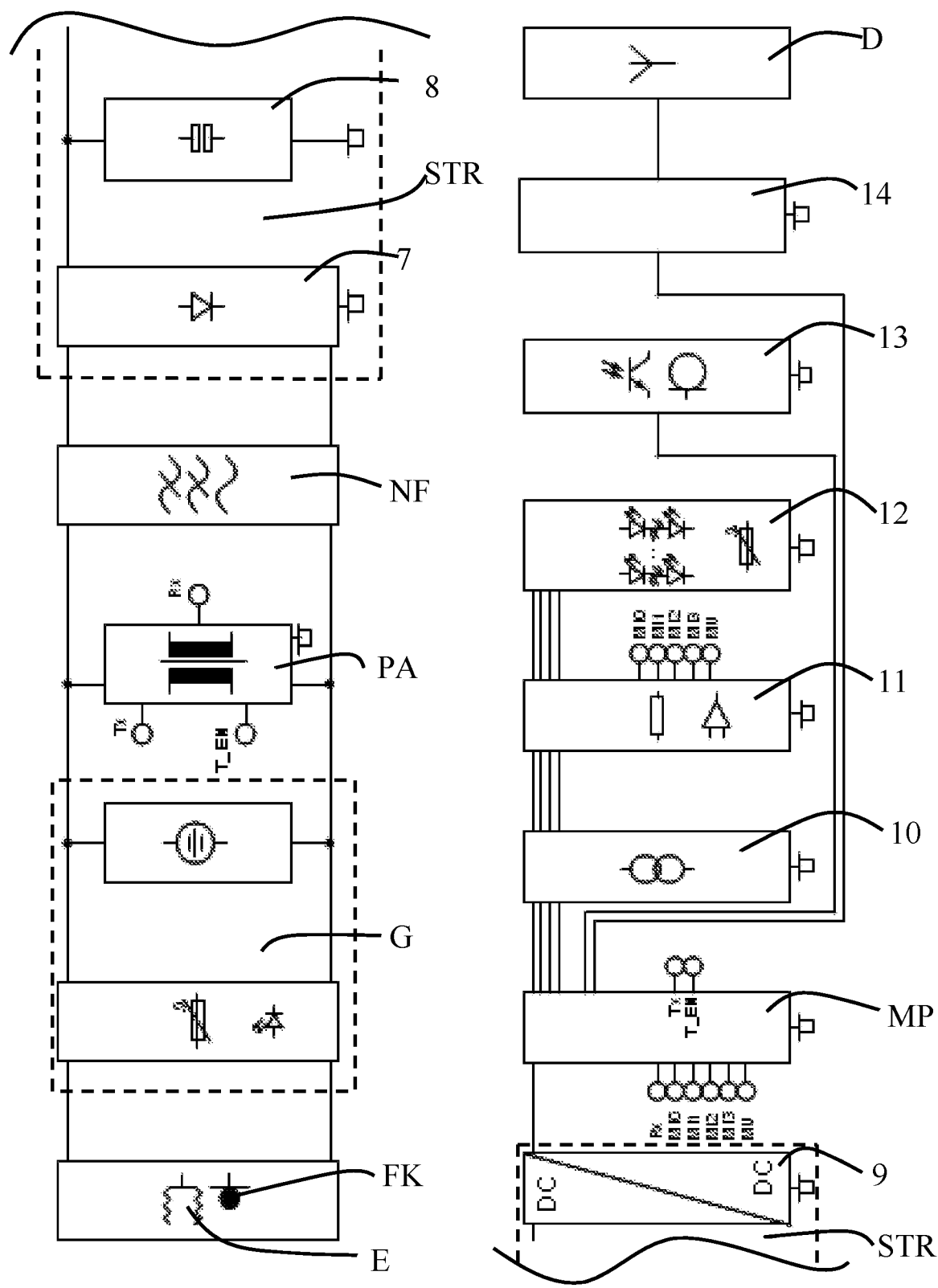
Figure 9:
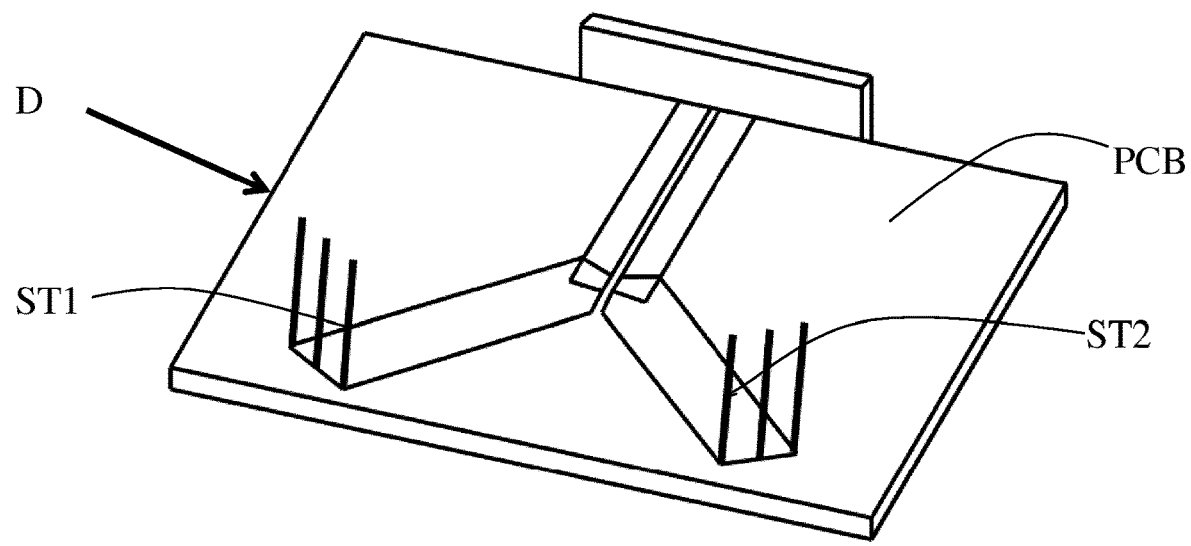
Figure 10A:
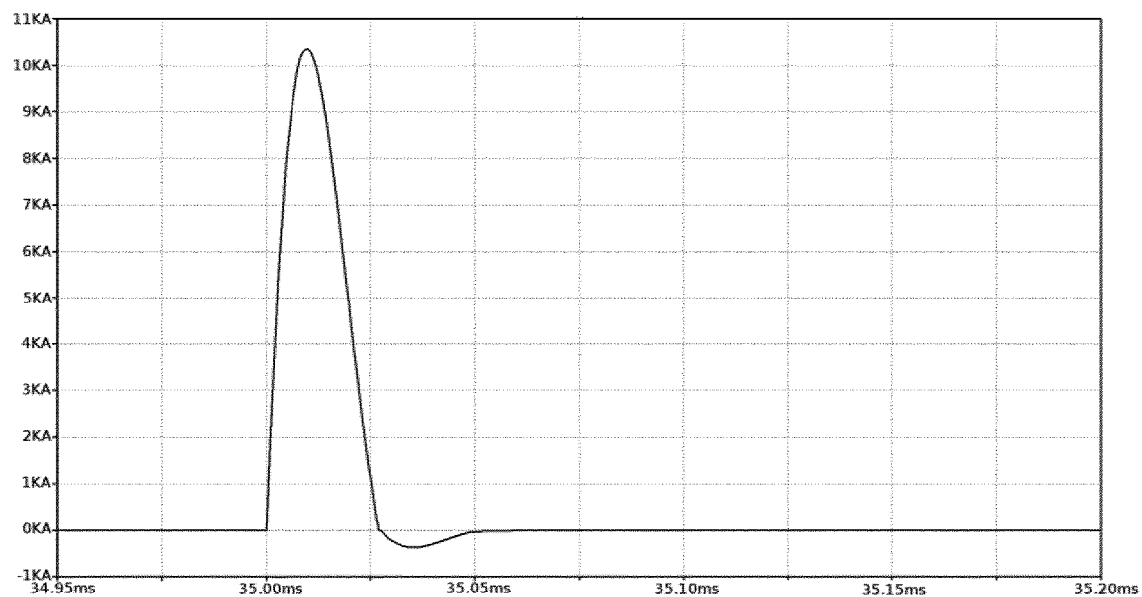
Figure 10B:
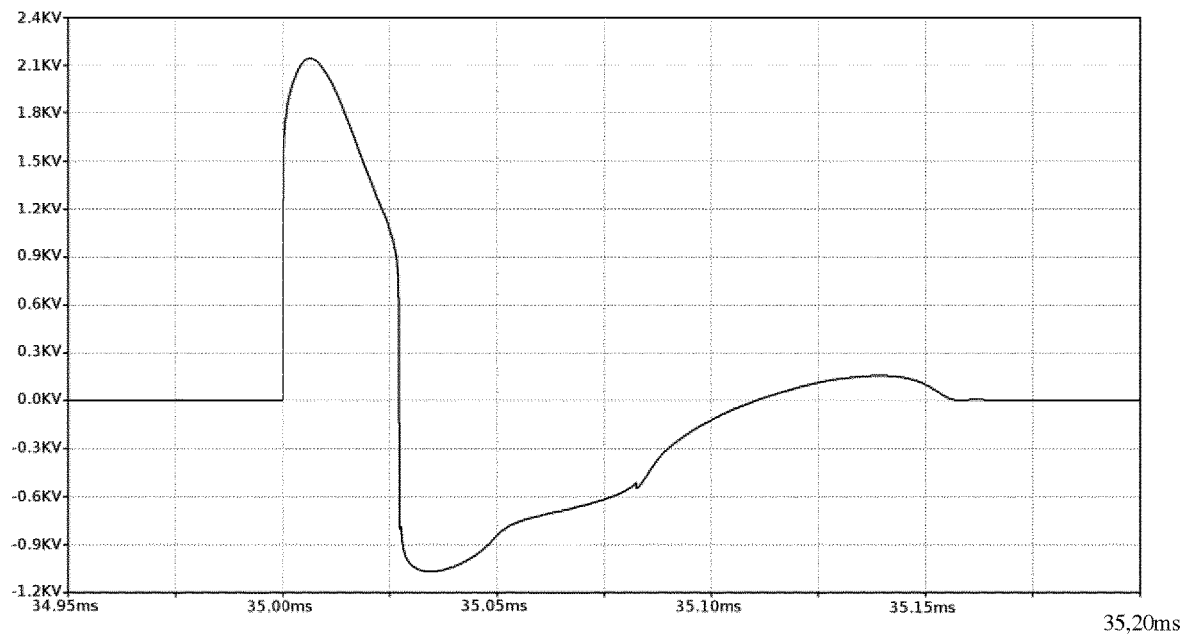
Figure 10C:
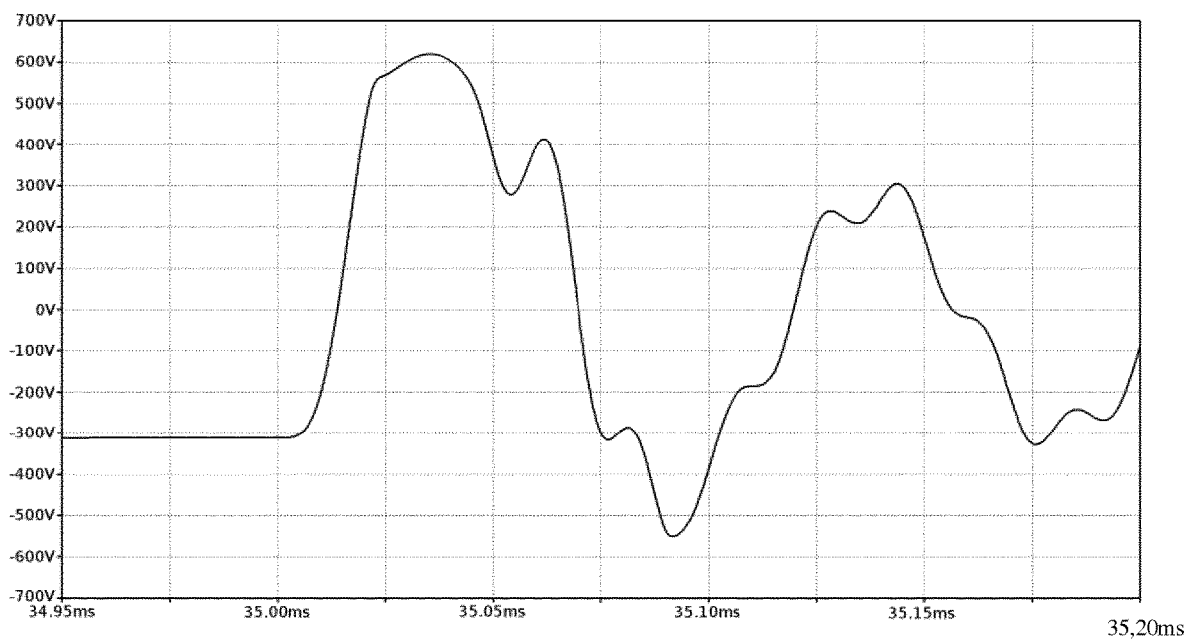
Figure 10D:
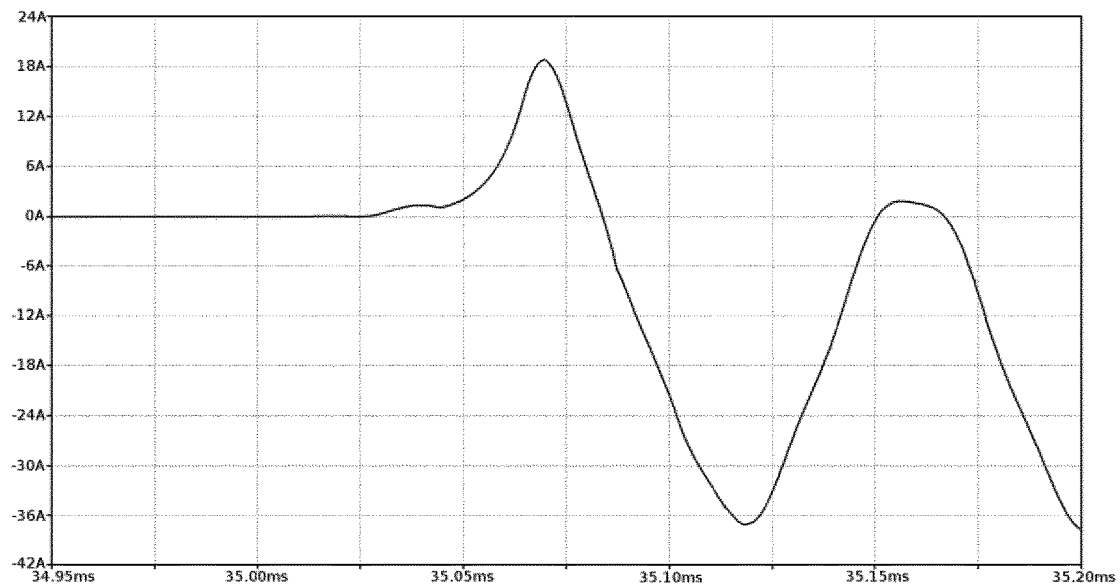
Figure 11:
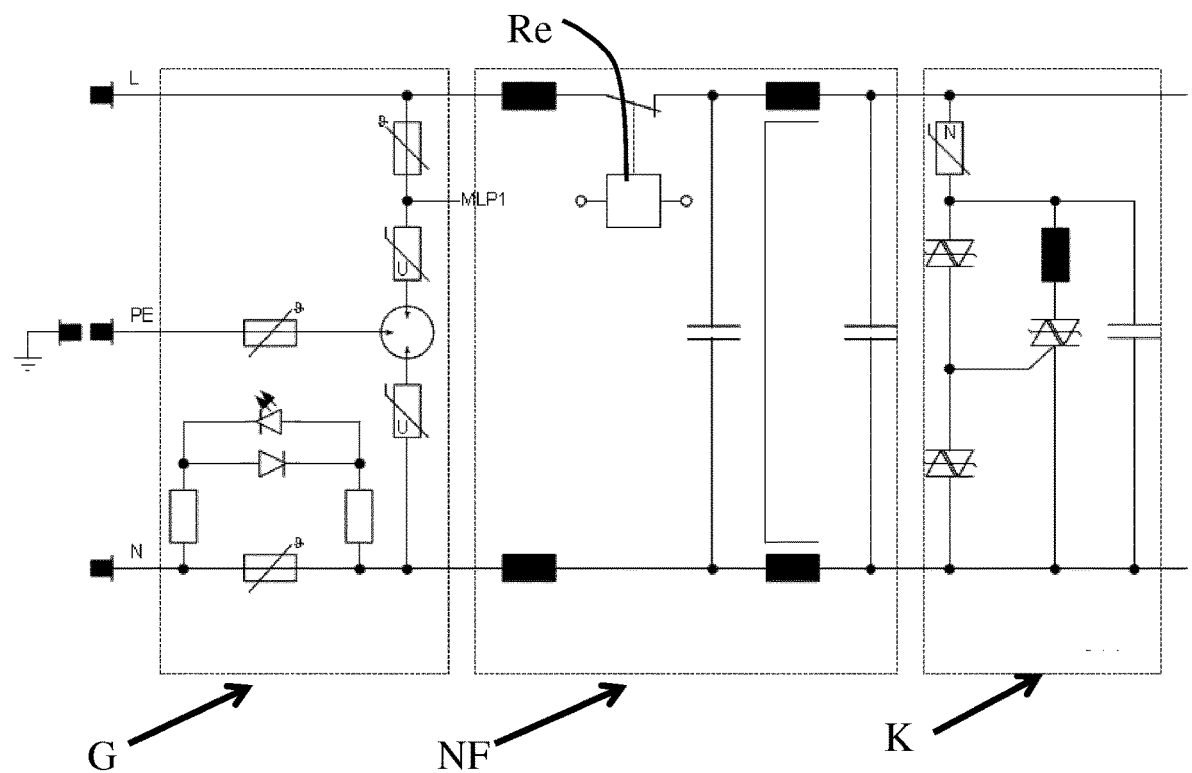

The further embodiment of the invention has the advantage that it is possible to connect different network topologies with each other. Such a connection of different networks increases the communication ranges. Furthermore, the operating device according to the invention are controlled by a DALI bus signal (Digital Addressable Lighting Interface is in the building automation a protocol for controlling lighting equipment operating devices) via the powerline communication interface, so that without entrainment of an additional control line in the supply line up to, for example, 64 lights can operate in a bus segment, states can be confirmed and it is possible to reduce the standby losses of the lights/individual bulbs even when switched off Further advantages and details can be taken from the following description of preferred embodiments of the invention with reference to the drawing. In the drawing shows:

FIG. 1 a block diagram for overvoltage and overcurrent protection,

FIG. 2 a block diagram for a coarse protection as lightning protection,

FIG. 3 a block diagram of an energy absorber,

FIG. 4 a block diagram of an interface circuit of the operating device according to the invention, FIG. 5a a block diagram of an operating device with connected LED bulbs, Wi-Fi adapter and video camera, FIG. 5b a block diagram for varying isolated and non-isolated structure, FIG. 6 a block diagram of cascaded operating devices for a system according to FIG. 5, FIG. 7 a second embodiment of an operating device according to the invention, FIG. 8 a block diagram of the system according to FIG. 7, FIG. 9 an antenna for an operating device according to the above embodiments of the invention, FIG. 10a the time profile of a standard current pulse 8/20 µs at the input of the coarse protection G, FIG. 10b the time profile of the associated terminal voltage of the coarse protection G, FIG. 10c the time profile of the output voltage of the line filter NF, FIG. 10d the time profile of the current through the clamping circuit K of the inventive operating device and FIG. 11 the structure of a network filter NF according to the invention.

FIG. 1 shows a block diagram for overvoltage and overcurrent protection of the operating device, which protects the hardware against overvoltages and overcurrent.

The protection consists of various successively staggered and coordinated circuit areas. Each of these circuit areas performs different tasks for protection.

The first embodiment of the operating device according to the invention has both a first branch for the connection of a light source (with a protection of the power supply STR, see dashed line) and a second branch (with a protection, in particular a power line coupling PA, see dashed line) for the connection of at least a communication module of a device to separate first and second interface circuits SS1, SS2 at the output of the operating device.

At the input of the operating device is arranged a common coarse protection G for first and second branch (see FIG. 2), hereinafter referred coarse protection, which has a gas arrester 1 and in series with the gas arrester 1 two varistors 2 and protects the system against large pulses. Overvoltages are limited to a lower voltage and the pulse at the input of the system is short-circuited. For overvoltage and overcurrent protection, a line filter NF connected to the output of the coarse protection G in the first branch has the task of delaying, reducing and folding the voltage pulse limited by the coarse protection G for subsequent circuit parts and of reducing the slew rate (see in more detail below described four tasks for the inventive network filter NF). If, after the line filter NF, the residual voltage of the pulse is too high for the subsequent circuit parts, this is limited due to a terminal circuit K connected to the output of the network filter NF, consisting in the first stage of a fine protection F and in the 2nd stage of a first energy absorber E1. Here, the fine protection F activates the first energy absorber E1 and there is a short circuit of the voltage pulse to protect the subsequent circuit parts from damage. When reaching the next zero crossing of the mains voltage, the short circuit is deactivated again. Upon further response of the fine protection F, a new activation of the first energy absorber E1 takes place.

Furthermore, in the first branch at the output of the clamping circuit K, a second energy absorber E2 is connected, which limits the current when it is switched on by means of an NTC-resistor NTC (negative temperature coefficient thermistor, thermistor). This protects the circuit from high currents and at the same time relieves the supply network. In normal operation, the NTC-resistor is bypassed to minimize power dissipation. If the second energy absorber E2 detects an overvoltage pulse, this bridging is canceled again. This increases the internal resistance of the circuit and reduces the energy occurring in the subsequent circuit parts. Furthermore, the second energy absorber E2 acts as inrush current limit.

The Powerline coupling PA (second branch) couples the communication signals of a Powerline connection directly to the mains supply lines. For this reason, only the coarse protection G protects the coupling, but not subsequent protective devices. Due to the clamping voltage of the coarse protection G, whose value would still cause damage to the coupling circuit, the circuit requires additional protection measures. For this purpose, a middle protection M is connected to a transformer Ü at the output of the coarse protection G in the second branch, which goes into saturation during the overvoltage pulse. The saturation effects of the transformer Ü cause a strong limited transmission of the pulse energy to the secondary side of the transformer Ü. In addition, there are components on the secondary side, namely a first fine-protection circuit F1, a filter FK connected thereto for separating communication signals fed in parallel into the power supply network and a second one fine protection circuit F2 connected to this filter FK, which limit the remaining voltage pulse. According to the invention, a first fine protection circuit F1 of the power line coupling PA is connected to the secondary side of the transformer Ü, which additionally protects components of the circuit which are sensitive to interference, in particular all inputs of a microprocessor MP, by voltage-limiting components (clamping diodes).

To protect the output stage of the operating device/ballast against overvoltages and overcurrent, which act on the ballast of the lamp, this first interface circuit SS1 is provided with corresponding limiting circuits. The second interface circuit SS2 also has overvoltage and overcurrent protection to protect the ballast (see FIG. 1 upstream fine protection circuit F2). The staggered protective measures ensure effective protection of the entire control gear/ballast. The operation of the protective devices is dimensioned so that the respective devices effectively protect all subsequent circuit parts of primary and secondary.

Below is a detailed description of the individual elements of overvoltage and overcurrent protection. The coarse protection G shown in FIG. 2 protects the system from major voltage and current pulses, such as these, for example, occur during lightning events.

In the case of a pulse ignites a gas collector 1 and thereby limits the pulse. When dimensioning the arrester 1, make sure that it only ignite with overvoltage or overcurrent pulses and not in normal operation. To clear the arrester 1, it is necessary to limit the current through the arrester 1. For this reason, two varistors 2 are connected in series with the arrester 1. A varistor 2 is connected between the L-conductor and arrester 1. The second varistor 2 is connected between the N conductor and the arrester 1. In order to limit the current through the arrester 1 accordingly, it is necessary that the "stand-off" voltage of the two varistors 2 in total is greater than the mains voltage. Due to the supply network topology, the varistors 2 can be asymmetrically dimensioned, with the result that the clamping voltage of the coarse protection G is reduced. It is assumed that the neutral conductor N and the ground conductor PE are connected in the network. This ensures that there are no major potential differences between the neutral conductor N and the ground conductor PE.

At the end of life of the varistors 2, the leakage current flowing through them increases. As a result, the varistor 2 heat up, which can lead to thermal destruction of the component. To prevent this, a thermal fuse 4 is placed very close to the varistor 2 (thermal coupling). In the event of excessive heating of the varistors 2, this fuse 4 triggers and disconnects the circuit from the supply voltage L in order to prevent thermal destruction of the varistors 2.

The separation of the coarse protection G from the supply voltage L leads to a loss of the protective effect of the coarse protection G. For this reason, a monitoring circuit 3 detects the separation of the coarse protection G, and reports this to the microprocessor MP of the operating device/ballast.

For the functional safety of the system, a second thermal fuse 5 is installed between the N conductor connection and the coarse protection G. This fuse triggers in case of overcurrent of the system and thus prevents a short circuit of the primary power supply. In addition, this fuse triggers also in case of excessive heating of the device. In both cases, a safe separation of the operating device/ballast from the network is done. A status display/display means 6, in particular a light-emitting diode/LED, indicates the disconnection on the housing of the operating device/ballast.

The arrangement of the two thermal fuses 4, 5 allows optimum protection with minimal power loss of the fuses, since there is only one fuse in the energy path. Optionally, a reduced protection without grounding PE is possible. This allows the use of the control gear/ballast as a device of protection class II (devices of protection class II need not be connected to a protective conductor and the protective conductor can be omitted, i.e. the contact protection is ensured by a protective insulation, whereby all voltage leading parts in addition to the operating isolation still have a further isolation). Optionally, the earth conductor PE can also be used to protect the interfaces SS1. For this purpose, the ground conductor PE is internally connected to the interface protection circuit. Devices of protection class I must be connected to a protective conductor, i.e. all metal parts that can pick up voltage during operation and maintenance, in the event of a fault must be conductively connected to the earth conductor. In detail, see the following description to FIG. 5b.

To reach a distance between phase L and earth conductor PE or to ensure neutral conductor N and earth conductor PE of 4 mm, this demanded from a standard for safe electrical separation, an additional thermal fuse 7 is implemented at the earth conductor connection point of the gas extractor 1 (see FIGS. 2 and 11). As a result, in each path there are two thermal fuses connected in series, each having 2 mm separation distance.

All thermal fuses, namely 4, 5 and 7 are thermally coupled to the varistors 2. As a result, the increased leakage current of the varistors 2 at the end of life is detected. The line filter NF arranged in the first branch assumes four tasks in the operating device/ballast:

First, in the case of overvoltage or overcurrent pulse, the terminal voltage L, which remains pending at the output of the coarse protection circuit G, is folded (by the properties of the line filter NF, the energy distribution is changed/delayed in the time domain) and the pulse is delayed passed to subsequent circuit parts. The folding of the voltage pulse causes a reduction of the peak value with a simultaneous extension of the pulse.

Mathematically, the function of the pulse "p" is folded with the function "f" of the network filter NF. The calculation is done in the time domain. The result of the folding is:

$$y(t)=p(t)*f(t)=\int p(t-\tau) \times f(\tau) d\tau$$

For example, a Laplace transform transforms the functions into the frequency domain.

In the frequency domain, the folding results in a multiplication according to the equation:

$$Y=P \times F$$

whereby a suitable choice of the filter function reduces the peak value of the pulse and at the same time extends the duration of the pulse. The energy of the pulse remains unchanged.

The delay of the pulse ensures that lightning protection responds as a first measure to an overvoltage or overcurrent event. As a result, the main energy of the pulse is reduced at the coarse protection G.

The second task of the network filter NF is a filtering of the system, for example generated in the internal power supply and in the lamp control generated common mode noise and push-pull interferences.

The third task of the network filter NF is the generation of high impedance for the powerline communication signals fed into the network in parallel. Communication via Powerline takes place in a frequency range between 30 kHz and 500 kHz. This frequency range requires the high impedance in order not to short-circuit the communication signals or to strongly attenuate them by low impedance. High impedance allows a good signal transmission from the mains to the coupling circuit and vice versa.

The fourth object of the network filter NF is to protect the first energy absorber E1 from fast current slew rates resulting from shorting an overcurrent pulse.

FIG. 11 shows a preferred embodiment of the network filter NF according to the invention, namely an LC filter 4. order with low-pass behavior. The corner frequency (−3 dB) is set at 2 kHz. The line filter NF is isolated from the ground potential/ground conductor PE. The isolation prevents power line communications signals from being coupled to the ground potential/ground conductor PE. It also prevents disturbances on the ground potential/ground conductor PE influencing the power-line communication PLC. This is an essential difference to the conventional network filters.

In summary, the line filter NF thus has four functions:
1) interference suppression of the network of internal switching disturbances of the operating device.
2) represents a high impedance termination/barrier for the Power Line Communication PLC.
3) folding of the energy pulses during lightning strikes/events.
4) reduces the slew rate of current pulses to a value acceptable by the triac (see FIG. 1, first energy absorber E1).

The solution described above is a pure hardware-technical implementation/development and does not require any software/firmware interventions.

In addition, a protection against temporary overvoltage is included. The control gear should detect overvoltages caused by mains faults and disconnect the input connection of mains in order to protect the downstream components against overvoltage. As soon as the overvoltage fault has been resolved, the operating device switches the input again and normal operation continues. The switch-on/switch-off is a relay L looped in phase L (see FIG. 11). Thus, the requirements for insulation distances can be ensured. The function of the coarse protection G, the line filter NF and the clamping circuit K is given in each operating state of the device, i.e. even without supply voltage, the protective measures of the described circuit acts.

The clamping circuit K is constructed in two stages. The first stage (fine protection) detects an overvoltage that may be present at the output of the line filter. This level limits the overvoltage. Due to the limitation, the second stage (energy absorber E1, with switch, z. B. MosFet, TRIAC) acts, which ultimately short-circuits the residual energy (overvoltage). In the design of the control gear/ballast, the first stage is realized by clamping diodes. The second stage is a TRIAC. The limitation and the short circuit of the clamping circuit limits the voltage for the subsequent circuit parts. The TRIAC automatically clears the line voltage L when the next zero crossing is reached.

To protect the components in the clamping circuit K from fast voltage and current increases, an inductance is installed at the input of the clamping circuit K. The inductor slows down the increases. Another task of the inductor is to limit the voltage increase when clearing the TRIAC. Limiting the rise prevents re-ignition of the TRIAC.

A monitoring circuit 3 detects a possible failure of the circuit and reports it to the microprocessor MP of the control gear/ballast.

Before switching on the system, all capacities of the system are discharged. A discharged capacity represents a short circuit at the moment of switch-on. In order to prevent this short circuit in the switch-on, an inrush current limit is integrated in the operating device/ballast, which is shown in FIG. 3 and described in more detail below.

At the moment of switch-on, a temperature-dependent resistor, in particular an NTC-resistor NTC, limits the inrush current. This protects on the one hand the circuit against inadmissibly high currents, and on the other hand also causes a reduction in the load on the supply network. After the switch-on, i.e. after a few network periods, the NTC-resistor NTC is automatically short-circuited via a first switch S1. This reduces the power loss of the system.

During an overvoltage event, energy absorber 2 detects this overvoltage. Then the NTC-resistor NTC is automatically switched back into the circuit by means of a first switch S2. This increases the internal resistance of the circuit. The increased internal resistance prevents subsequent circuit parts being loaded with high energy pulses. After the decay of the voltage pulse, a renewed short circuit of the NTC-resistor NTC takes place.

The Powerline coupling PA couples the communication signals directly to the mains supply lines. For this reason, only the coarse protection G, but not subsequent protective devices protects the coupling. Due to the clamping voltage of the coarse protection G, whose value would still cause damage to the coupling circuit, the circuit requires additional protection measures.

The existing in the medium protection M transformer Ü (see FIG. 1) goes during the overvoltage pulse into saturation. The saturation effects of the transformer Ü cause a strong limited transmission of the pulse energy to the secondary side of the transformer Ü. In addition, there are components on the secondary side, in particular the first fine protection F1, which limit the remaining voltage pulse. For the generation of safety extra-low voltage (SELV voltage, Safety Extra Low Voltage), the transformer Ü is constructed in such a way that a short circuit between the primary winding and the secondary winding as well as its connections is not possible. The windings of the primary circuit or secondary circuits can only be superimposed if there is a double or reinforced insulation between them as galvanic isolation. Alternatively, the windings can be accommodated above or next to one another in separate insulating chambers. The safety extra-low voltage is a small electrical voltage, which, due to its low height—below 25 volts AC or 60 volts DC—and the insulation against higher voltage circuits, offers special protection against electric shock.

All components of the coupling on the line side of the transformer Ü are designed for the clamping voltage of the coarse protection G.

The sensitive inputs and outputs of the coupling to the digital and analog signal processing modules or Class A/B-amplifiers are additionally protected by fine-protection measures in the form of clamping diodes F1. These are designed so that they do not affect the communication signal, in particular the powerline signal.

The protective circuit US shown in FIG. 4 and arranged in the interface SS1 to the light sources protects the system against pulses, which act on the system coming from the side of the light sources. Here is an example a lightning strike in the housing of the lamp listed, which generates an overvoltage, which acts on the lamp/ballast from the light source. The protection is constructed in the same way as the coarse protection G at the input of the control gear/ballast, i.e. also with filter and fine protection (clamping diode).

In the case of SELV lamp outputs (as power source, the transformer Ü/safety transformer is used), the protective circuit ÜS continues to fulfill the task of limiting the maximum output voltage to a safe level. This is necessary above all in the event of a fault, because then, for a short time, higher voltages can occur until internal safety mechanisms act.

In the case of an LED lighting application, the LEDs are usually connected in series and are operated at a constant current for optimum, uniform brightness, color and intensity. Constant current sources have (with an open circuit) a maximum output voltage. The fuses to be provided must be robust enough to withstand current surges of usually 3 kA, but also up to 6 kA. They also need to react quickly enough to prevent component failure. Criteria for selecting the upstream fuse at the AC input include voltage, amperage, and the $I^2t$ value.

To protect the user of the control gear/ballast from electric shock, all interfaces, i.e. the light control and the communication interfaces (except PLC) are disconnected from the power supply. The interface for the lamp control can comply with the rules for safety extra-low voltage (SELV) by:
- electrical isolation of all interfaces, including the lamp control, from the supply network,
- separation of the interfaces both with transformers and optically,
- voltage supply of the additional modules and devices is also electrically isolated,
- safe isolation and limitation of all output voltage to less than or equal to 120 VDC, to comply with the SELV (safety extra low voltage) criteria.

If no operation of the control gear/ballast is required, the control gear/ballast microprocessor MP will switch off by deactivating the auxiliary power supply. In this mode, only the ECO mode circuit is in operation. This operating mode allows a very low energy consumption (<100 mW) without having to switch off the mains voltage, while maintaining the protective effect in active ECO mode.

There are three options for supplying the ECO mode circuit:
1. Power supply via a DC voltage, which also supplies the microprocessor of the control gear/ballast.

The power supply is available only in normal operating condition. When the auxiliary power supply is switched off, this power supply is also switched off
2. Power supply via a high-impedance circuit with the mains voltage.

The high-impedance connection limits the current flow. In addition, the value of the power supply must be limited to protect the ECO-mode circuit from damage. In the present circuit, for the purpose of component reduction, the monitoring circuit/monitoring circuit 3 (see FIG. 2) for lightning protection (coarse protection G) is simultaneously used for the voltage supply of the ECO mode circuit.
3. Power supply via capacitor When switched on (point 1) or in the case of mains voltage supply (point 2), a capacitor charges up. As soon as the input voltages are switched off, the ECO-mode circuit can supply itself from the capacitor for a longer time.

There are various options for leaving ECO-mode:
1. Time-controlled: The microprocessor of the control gear/ballast adjusts the ECO-mode for a certain period of time. When this time has elapsed, the ECO-mode switches the system on (again).
2. During a power cycle (switching the mains voltage off and on again), the control gear/ballast automatically switches on again. This is also the case insofar as the ECO-mode was activated before switching off
3. A connected to the operating device/ballast communication module (for example Bluetooth, Ethernet module, etc.) can switch the operating state of ECO-mode to normal operation.

For communication, each operating device/ballast preferably has a powerline communication interface which is suitable for the following tasks:
- Control of the operating device/ballast (lighting on, switching off and dimming, etc.),
- Querying status information of the operating device/ballast,
- Initializing the parameters of the lamp,
- Update of the firmware of the control gear/ballast.

In addition to the powerline communication, further communication interfaces may be available. The following list shows some examples, but should not be considered as complete:
- Bluetooth.
- Ethernet.
- Fiber optic technology (LWL).
- Wireless LAN (WLAN).
- Digital Addressable Lighting Interface (DALI).
- 1-10 V interface.
- PWM.

All these interfaces are used for the following tasks:
- Control of the ballast (light source switching on, switching off and dimming etc.
- Check status of ballast signals.
- Initialize lamp parameters.
- Upgrade ballast firmware.
- Connect external devices (e.g. security camera, motion detectors, sensors and actuators, etc.).

The operating device/ballast can work between the individual communication interfaces (for example between WLAN and Powerline) as a gateway. This makes it possible to connect different network topologies together. Such a connection of different networks increases the communication ranges.

The Ethernet interface has two ports and also works as an Ethernet switch. Thus, up to two different Ethernet devices can be connected to the operating device/ballast, which can thus communicate with each other without the microprocessor MP of the operating device/ballast.

The communication path between the operating device/ballast and the communication modules is isolated galvanically from the supply voltage network. Likewise, these interfaces can additionally be supplied by the operating unit/ballast via a galvanically isolated supply voltage.

The compactly designed housing (not shown in the drawing) ensures a variety of connection and system variations of the control gear/ballast. The different variations of the housing construction allow a simple, inexpensive production at no extra cost and a complex solution. Likewise, the construction allows a simple and quick installation of the components (for example the assembled printed circuit boards, heatsinks and partitions) of the operating device/ballast in the housing. In addition, the housing meets all valid requirements against direct contact and ingress of liquids and micro particles.

The housing of the control gear/ballast consists of two symmetrical half-shells (not shown in the drawing), which by means of snap technology, e.g. be joined or closed by merging multiple snap closures. This results in a simple and safe installation. The snap closures of the half shells are outside the sealed area.

The housing is designed in such a way that, depending on the field of application, different components (controller board with microprocessor MP, different ballast control and communication modules) can be installed in it. Flat and lateral mounting holes in the projection of the half-shells allow variable mounting positions of the device.

Depending on the cable entry (by means of a cable gland or grommet) and type of encapsulation (filled potting compound), a degree of protection of up to IP68 can be achieved. The encapsulation of an assembly in a half-shell can be variable stepwise (1 to 4 stages). As a result, the amount of potting compound can be minimized depending on the structure of the module used and optimized for their protection. Optionally, the entire housing can be cast, although more potting compound is needed, but reduces the manufacturing cost.

The half-shells have a groove in the side walls. Here you can optionally insert a sealing cord to achieve a tightness of the housing. In this case, the casting can be omitted.

By cooling plates inserted in the housing (not shown in the drawing), there is an efficient heat management for components with higher heat development through optimized heat dissipation to the environment. To compensate for different component heights, optional cooling blocks can also be inserted into the housing. By using a heat conducting foil, which is glued to the outside of the housing in a depression, impressed in the half-shells (not shown in the drawing), the heat output can be further improved by a direct thermal coupling takes place at this point with the mounting bracket.

In order to achieve improved EMC shielding by means of potential bonding, the cooling plates can be connected to the printed circuit boards by means of a threaded bolt and screw. Optionally, a potential separation or potential bonding between protective earth (on the network input side) and the functional earth (on the bulb and interface side) can take place.

In the half shells guides for the connector (not shown in the drawing) are incorporated, whereby the correct alignment of the modules (controller board and possibly communication module or ballast control) is guaranteed in the respective half-shell. Since this also compensates for tolerances of printed circuit board production, a further attachment of the modules and connectors is not required. The guides are leading, so that also takes an alignment between the two half-shells.

The half shells result in a functional separation of the device: A half shell contains the controller board with microprocessor and optionally an universal interface for additional variants of communication modules. The other half shell contains the ballast control, whose model depends on the power class of the used light source. This function separation allows a simple adaptation of the ballast to the used light source, power classes, potential separation and protection class as well as a simple and efficient (fast) repair with optimized spare parts storage for the devices.

For example, up to eight status indicators/display means (SMD LEDs) can be directly installed on the printed circuit boards, as the light pipe is routed directly to the outer wall of the housing by means of simple light pipes in the potting compound. For this purpose, located in the housing half shells at the points, where the light pipes meet the housing half shell, there are guide rings and recesses in the housing wall (not shown in the drawing). These recesses give better visibility of the status indicators. The guide rings are used for light guidance and adjustment of the light pipe and at the same time for protection against unintentional inflow of the potting compound into the light channel.

FIG. 5a shows, as an example, the operating device/ballast (or its controller board DLCB with microprocessor MP) and its integration in an installation. At the lamp interface K1, K2, K3, K4 (i.e. channel 1 to 4), for example, four LED bulbs 12 are connected, which are powered by a DC power source located in the operating device/ballast. The optional interface DL-SS is in this case for an Ethernet module, whereby alternatively also a DALI, BLE (Bluetooth low energy, current-saving mode of Bluetooth), PWM (pulse width modulation) or 1-10 V module (see dotted line DALI, BLE, PWM, 1-10 V) would be possible. At the one interface of the Ethernet module is connected a video surveillance camera (1), at the other a Wi-Fi adapter Wi-Fi (x). Both devices are powered via passive Power-over-Ethernet (POE*).

Furthermore, it is possible within the scope of the invention to vary the isolated and non-insulated structure (see FIG. 5a dot-dash line to PE and the dashed line "option"), which will be explained in more detail below with reference to FIG. 5b. FIG. 5b shows the arrangement of primary overvoltage protection and secondary overvoltage protection in an insulated housing, preferably with 3-pin GAP (gas disturber tube, see also FIG. 2: arrester 1) for each of the two supply lines L, N. The potential separation is done by the transducers Ü in the power supply STR. The arrangement allows equipotential bonding from secondary to primary via the connection GAP A/Pkt. 2 in accordance with GAP B/Pt. 2 (Coupling via resistor F takes place only for equipotential bonding in the case of leakage), or separate earth connection.

Furthermore, it is also possible to connect the primary side to the network ground PE, i.e. GAP A/Pt. 2 no connection to GAP B/Pkt. 2 and instead GAP B/Pkt. 2 and use as functional potential for the secondary side for the derivation or use as reference potential. The overvoltage protection of the primary side is achieved by GAP A, secondary by GAP B. The combination options are shown in the following table:

| System function | housing A/ Construction | housing. B | Protection Primary | connection (P-S) | Protection sekundary | Load/ Electronics | housing c/Construction | housing D/Construction |
|---|---|---|---|---|---|---|---|---|
| ISO | ISO | ISO | k.A. | verb. | k.A. | ISO | ISO | ISO |
| ISO | ISO | ISO | E-verb. | k. verb. | k.A. | X | X | X |
| ISO | ISO | ISO | E-verb. | k. verb. | FP-verb. | X | X | X |
| ISO | E-verb. | ISO | E-verb. | verb. | k.A. | ISO | ISO | ISO |
| ISO | E-verb. | ISO | k.A. | k. verb. | FP-verb. | ISO | ISO | ISO |
| N-ISO | E-verb. | ISO ISO | E-verb. | verb. | FP-verb. | X | X | X |

This means:
Geh.   Housing
ISO    isolated
N-ISO  not insulated
k.A.   no connection
E      Earth
FP     Function Potential (earth)
P      Primary
Prot.  Protection

| System function | housing A/ Construction | housing. B | Protection Primary | connection (P-S) | Protection sekundary | Load/ Electronics | housing c/Construction | housing D/Construction |
|---|---|---|---|---|---|---|---|---|
| S verb. | Secondary connected/connection | | | | | | | |
| k. verb. | no connection | | | | | | | |

For devices of protection class II or III there is a separation of functional earth (Function Potential) and protective earth (Prot.). The protective earth of a consumer, with a few exceptions, must not be connected to the functional earth, as the functional earth is not intended to take over protective earth functions; conversely, this is possible. Connecting the protective conductor to the functional earth connection (FP) cannot guarantee personal safety, however, a conductive connection between the protective earth (Prot.) and the functional earth (FP) at different points is possible. Functional grounding (FP) is a functional part and essential for the regular operation of a device, while protective earth (Prot.) serves to protect people from electric shock and provides protection in the event of a fault.

FIG. 6 describes an application example in the event that the supply of the interface module for the surveillance camera video is insufficient. Shown twice is the control gear/ballast (or their controller boards DLCB with microprocessor MP), each with Ethernet module as an optional interface DL-SS, whereas both ballasts via an Ethernet interface are cascaded (see line K). As already described in FIG. 5, an LED illuminant 12 is connected to the upper ballast on all four channels K1 to K4 of the lamp interface. On the still free Ethernet interface of the upper control gear/ballast are connected two cascaded Wi-Fi adapters, and possible sensors and/or actuators (for example brightness sensor, weather sensor, etc.). All these devices are powered by passive Power-over-Ethernet POE.

In the case of the lower operating device/ballast, on the other hand, a video surveillance camera is connected to the free Ethernet interface, which in this case should represent a stronger consumer. In order to ensure the energy consumption of this video surveillance camera via Power-over-Ethernet POE, the DC power supply, which in the other case supplies the LED lamps 12 connected to the four LED channels, is used to supply the video surveillance camera with energy, since the supplying of the interface module alone would not be enough.

FIG. 7 and FIG. 8 show a second embodiment of a control gear/ballast according to the invention integrated in an LED lamp for 230 V/115 V with electronics in the lamp base E, for example E-thread of a commercial incandescent lamp, for the realization of a complete device. The complete device integrates an LED lamp 12 and a gateway, wherein the necessary for the lamp function electronics for the operation of the LEDs 12 is included in the device, the function of which is known and will therefore not be described further. For the identical modules/modules, the same reference numerals are used in FIGS. 7 and 8 as for the embodiment of a control gear/ballast according to the invention described in particular with reference to FIG. 1.

As the structural design according to FIG. 7 shows, the complete device consists of a "luminous element" and a device base E with a connection socket (E-thread and foot contact FK). In the upper part of the lamp with the protective cap SK, the LEDs 12 and a light distribution optics 13a (diffuser) and sensors 13b (in particular brightness, color) are included, the lower part contains all the electronics, both for the LED drive, as well as for PLC and BLE communication. This spatial arrangement reduces the temperature influence of the electronics. The intermediate space is preferably used for a Bluetooth receiver and balun 14 and an antenna D, wherein the housing shape makes it possible to realize a corresponding opening angle of the angled dipole D in a surprisingly simple manner (in detail see FIG. 9).

The lower end of the housing GH of the lamp is designed as a screw thread connection socket E. Standard threads come as in conventional incandescent lamps with z. B. E27 thread for use. Other connections are not necessary. This facilitates the installation by the user.

The electronics further implement a radio communication system, due to the very low energy consumption and widespread of Bluetooth low energy this is provided. This wireless standard is directly supported by all current smartphones and many laptops.

The electrical interconnection of the modules together can be seen from the block diagram of FIG. 8. The rough protection circuit G at the lower end of the housing GH of the lamp comprises, in addition to a thermal fuse, a display which is also used for functional safety. By this spatial arrangement, a glare-free reading of the display, in particular in the form of LEDs, is possible. The power line coupling PA according to the invention comprises the transformer Ü and the fine protection F1. In the power supply STR or power supply of the complete device are arranged in series, a bridge rectifier 7, an intermediate circuit capacitor 8 and a DC-DC converter (DC/DC converter). The microprocessor MP has the connections Rx (see secondary side of the transformer Ü of the power line coupling PA), the connections M0, M1, M2, M3, MU (which are connected to the outputs of a measured value acquisition 11 for regulating, controlling, and monitoring constant current sources 10) and the connections Tx, T_EN to the primary side of the transformer Ü of the power line coupling PA. In addition, follows in series thereto the constant current sources 10, the measured value acquisition 11 (with the connections M0, M1, M2, M3, MU to the microprocessor MP), the LED lighting means 12, the sensors 13, the Bluetooth receiver and balun 14 and the antenna D.

For the radio system of the complete device an efficient antenna is needed, which nevertheless covers as much as possible all spatial areas equally and therefore should have no directivity and which will be described in more detail with reference to FIG. 9. According to the invention, a printed circuit board antenna with additional pins D are used in the housing GH. By the pins, a homogenization of the directional characteristic is achieved, the wide conducting path provide sufficient usable bandwidth, but also for a higher tolerance to environmental influences.

The functional configurations of the complete device are:
 a) implementation of a gateway function between BLE and PLC,
 b) use of BLE or PLC for controlling/monitoring the lamp, c) setup of a PLC network for connection to other control units without BLE,
d) data exchange with actuators and sensors via PLC or BLE, recording data from different sensors (e.g. B. brightness, but also switch) by means of BLE,
e) recording of meter data from energy meters with BLE, transfer of meter data to Bridge to extern PLC network of the grid operator, for example for billing purposes,
f) configuration of the network/system,
g) application of security features, in particular authentication, encryption, integrity checking,
h) software update via PLC or BLE,
i) integration of diagnostic functions, hereby different degrees of detail for appropriate user groups and
j) possibly redundant BLE-PLC transition when using several complete devices in the same space, also to improve radio coverage, which are described in detail below.

to a)

The complete device allows bidirectional data exchange between the radio and PLC system. This allows different devices to be linked communicatively, each of which supports only one of the two systems. Furthermore, each system can serve to extend the range of the other. Due to the low range of BLE, PLC will usually be used for communication beyond the boundaries of a room.

to b)

In addition to the gateway function, the control electronics for the LEDs also represent a data end point, which can be reached from both communication systems. This allows on the one hand, to influence or to monitor the switching state and the brightness of the lamp, on the other hand to influence their status from the outside or to monitor. For this purpose, the data exchange with mobile phone via BLE for controlling the devices (lamps, etc.) and for display of measurement/sensor data/system can be done.

to c)

In a mixed installation of various PLC-capable devices, these can also be controlled, monitored and configured by the gateway using BLE, without even having BLE radio technology. Conversely, pure BLE devices can also be controlled, monitored and configured by means of the PLC using the gateway. In particular, this offers the advantage of being able to control the entire home automation system via BLE from one point, even if the radio range would not be sufficient for this purpose.

to d)

Sensors such as switches, brightness sensors, temperature sensors and actuators such as lamps, sockets, radiator valves, blinds can be connected via PLC or BLE. The choice of the communication system does not affect the functional possibilities due to the gateway function, so it can be made purely on the basis of the existing infrastructure in terms of power supply. For example, PLC components are preferably installed in places with mains supply, while others are connected by radio and, if necessary, supplied with batteries.

to e)

The data exchange is not limited to sensors used for home automation. Through the secure forwarding of the data, data from consumption meters can also be recorded by radio and transmitted to a relaying point externally by the PLC system. This allows freely placed counters in the house, for example to integrate water meter in the bathroom or gas meter in the basement with little effort in the remote reading. The communication connection to the billing center can, for example done by a bridge that is installed in the meter box or in the house supply. Depending on the equipment, this can also be integrated in the electronic electricity meter.

to f)

The smartphone or alternatively the laptop with BLE interface becomes the control center of the complete automation system. Since this interface is already included in almost all current devices, the user is very likely to have a suitable device immediately available and does not need to be purchased separately for the automation system. Thanks to the gateway function, not only the radio components can now be detected via this path, but the control, monitoring and configuration of the entire system including all PLC components is made possible.

to g)

Communication via BLE as well as via PLC is protected according to the state of the art regarding IT security. This includes in particular the processing of meter data, so that they can be used for billing purposes. But also the control of the home automation system needs good protection mechanisms in order to prevent interventions from the outside.

to h)

An updated firmware can be fed in and distributed via both communication systems so that all devices in the overall system can be reached.

to i)

By integrating detailed diagnostic functions, numerous parameters can be captured in the system to assess the state and the reserves of the communication systems and, in case of problems, to receive indications of possible errors/defects. This includes the control electronics for the LEDs and connected devices. This diagnostic data can either be evaluated by the user himself, or assessed by a specialist, depending on the nature of the error and the level of training of the user.

to j)

The gateway function between radio and PLC allows the use of gateways for easy extension of the radio range by installing additional complete devices at the edge of the coverage area.

Alternatively, multiple complete devices in the same space may be useful for achieving redundancy, both in terms of the radio connection itself, but also for data exchange with the PLC system.

In the context of the invention, other radio standards, such as ZigBee, WLAN, wMBus, for the device are alternatively also conceivable, provided that they can be operated in accordance with widespread and energy-saving. Furthermore, an adaptation of the antenna to the form factor of the device can be carried out and depending on the structural design of the devices, other antennas are used. Also, an integration of the gateway into other devices, e.g. Switch, LED Driver, Meter or similar could be done. In particular, the described functions of the gateway radio PLC can also be integrated into other devices in addition to lamps, in which case their basic function can be controlled in each case via the two communication paths. Depending on the type of device then eliminates the advantage of easy installation by the consumer. Devices with any combination of the corresponding communication systems can be connected to the overall system. Regardless, all functions are available through the gateway. In particular, with regard to IoT, the control of various consumers and devices other than light, e.g. heating, thermostats etc. could be done. This also applies to the industrial sector within IIOT.

Within the scope of the invention, an angled dipole antenna can be used on a printed circuit board of the operating device in the form of a pin stripe at the end of the strip line (see in detail FIG. 9). Suggestions regarding the effect of the location of the feed point, slot shape, slot size, slot position are known in the art. For example, a small rectified antenna is known from DE 60 2005 002 799 T2. Consequently, in order to operate the antenna in the bandwidth of an RFID system, the problem of complex conjugate matching between the transponder antenna and the semiconductor chip has to be solved. The antenna according to DE 60 2005 002 799 T2 comprises a dielectric substrate, a metal layer formed on the upper part of the dielectric substrate, a main slot formed as a pattern on the metal layer, having a longitudinal axis, two ends and upper and lower parts, a plurality sub-slots connected to one or the other end of the main slot and rotating in a predetermined direction, a plurality of first transverse slots extending on the upper part of the main slot at right angles to the main slot, a plurality of second transverse slots extending extend under a lower part of the main slot at right angles to the main slot, and an inlet of a semiconductor chip formed inside the main slot. The main slot, the plurality of sub-slots, and the plurality of first and second transverse slots may perform a conjugate resistance adjustment of the small antenna without an external matching element. The first and second transverse slots may be divided into two symmetrical groups by the longitudinal axis of the main slot, and the predetermined direction may be right-handed or left-handed. The small antenna has an improved RCS (Radar Cross Section) in an operating bandwidth of a transponder, without adversely affecting the radiation pattern, the polarization purity, etc. of the antenna.

Furthermore, from DE 601 22 698 T2 an improved multi-band planar antenna is known. The planar antenna includes a generally rectangular conductive plate defined by first and second pairs of opposite sides; a ground plane, a dielectric substrate between the plate and the ground plane, a feeding mechanism for applying electromagnetic signals to a feed point located on the conductive plate, and one or more slots formed in the plate, whereas each slot being spaced from the sides of the plate, wherein the feed point is arranged on an imaginary line through a corner and the center of the conductive plate or matches, a first slot comprises an elongated body portion, which is adjacent and parallel to one of the first sides of the plate. Furthermore, the antenna comprises a second slot comprising an elongated body portion disposed adjacent and parallel to the other of the first sides of the plate, the first slot comprising a corresponding foot slot portion disposed adjacent and parallel to a corresponding second side of the plate, wherein the second slot includes a corresponding foot slot portion disposed adjacent and parallel to the corresponding second sides of the panel. The antenna can resonate in a plurality of separate frequency bands. This means that the antenna is capable of multi-band operation without the need for additional resonant plates, shorting pins, mating circuits or multiple feed points. The feed mechanism is designed to provide a direct feed to the conductive plate, alternatively the plate may be fed by indirect coupling. Preferably, the antenna is formed of microstrips. In a preferred embodiment, the conductive plate has a generally rectangular shape and includes first and second slots, one on each side of the feed point, whereas each slot having an elongate body portion with a respective foot portion or adjacent both ends of the body portion, the slots are configured such that the respective elongated body portions are disposed substantially parallel with respect to a pair of opposite edges of the panel and that the respective foot portions are in close proximity to the other pair of opposed panel edges. Preferably, the one pair of opposed plate edges are the plate edges which emit electromagnetic energy during resonance in a frequency band, the conductive plate being primarily designed to resonate with respect to the frequency band. The first and second slots are substantially I-shaped and the respective foot portions are designed to be substantially parallel to the other opposing panel edges.

Furthermore, from DE 602 16 670 T2 an antenna with a relatively high average pattern gain (Pattern Averaged Gain, PAG) is known. The antenna comprises:

a first element having a first length in a first direction and having a first end at an endpoint of its length, a second end at the other endpoint of its length and a feed point, the first end being an open circle, and the second end is grounded, a second element remote from the first and having a second length in the first direction and including a first end at an endpoint of its length and a second end at the other endpoint of its length, whereas the first end is an open circle, and the second end is an open circle; wherein the first length A/4 corresponds to the resonant frequency, and the second length A/2 corresponds to the resonant frequency, the first end of the first element and the first end of the second element are substantially in line with a second direction, which is substantially perpendicular to the first direction.

An antenna according to the embodiments of the invention has a higher PAG number than an antenna consisting of only one of the two elements constituting the antenna. A higher PAG contributes directly to longer talk time/battery life and less power has to be sent from the antenna to achieve desired signal strength at a given remote point.

Finally, DE 697 01 837 T2 discloses a logarithmic periodic antenna fed by microstrip. A dipole assembly of the logarithmic periodic dipole antenna has a center feed conductor disposed between the two dipole strip conductors and connected to a dipole strip conductor connector disposed between the two dipole strip conductors. The logarithmic-periodic dipole antenna according to DE 697 01 837 T2 minimizes the effect of the feed line on the antenna performance and protects it from the effects of the weather, which makes the antenna more robust. It also has good impedance matching between the dipoles and the input terminal, high return loss, and excellent directional characteristics, especially in the 824 to 894 MHz frequency band.

The antenna D used in the context of the operating device according to the invention is shown in FIG. 9. According to the invention this is designed as an angled dipole D with at least one structural element, which extended the antenna in the 3rd Dimension, and which is differentially coupled. In particular, according to FIG. 9, two pin strips ST1, ST2 are provided, each with three pins ST1, ST2, which extend perpendicularly to the conductor trace of the angled dipole D. Due to the design of the antenna D as an angle dipole, the directional diagram is in a plane already approximately circular. By adding the structural elements according to the invention, "zeros" are compensated in the spatial directional diagram.

Furthermore, the antenna D should have a sufficient usable bandwidth, in particular allow a broadband adaptation. In the prior art, "thick" antenna conductors are used for this purpose. According to the invention this is realized by wide traces of a printed circuit board PCB and using a 3-pin header, instead of a single pin to extend the "thick" conductor in the 3rd dimension. As a side effect, this is actually easier for the manufacture than a single pin. The opening angle of the angled dipole D is between 60° and 80°, preferably at about 60°, the gap between the parallel wide strip traces, which continue in each case in an even wider trace of the elbow, is about half of the conductor track width. In the context of the invention, an additional connection for an external antenna (in particular for Bluetooth) can be provided, as well as the switching between internal and external antenna.

The usual Bluetooth chips 14 have a differential antenna connection. The data sheet/application diagram indicates which filters and balun circuits are required to convert it to an unbalanced 50Ω connection. This allows easy connection of external antennas and measurement devices. The design from the datasheet can be used directly. If an asymmetrical antenna is used, it can be connected directly to this structure.

In the case of an asymmetrical antenna such as a dipole D, also here considered, there are two variants:

1. Use of another balun for the antenna D

A standard-balun device or standard-balun design can be used for the antenna side. For the chip side, the design can be used from the datasheet and there is an unbalanced 50Ω connector for easy connection of external antennas and measurement devices.

2. Combination of filter/balun 1 and balun 2.

This embodiment has as an advantage a smaller number of components and a lower attenuation. The disadvantage is that a separate design for the combination is necessary and that no unbalanced 50Ω connection is available, which entails a much more complex measurement.

The particular advantages of the complete device according to the invention according to FIG. 7 are the ease of installation by users, e.g. there is no installation by a professional—as in the first embodiment of the operating device according to FIG. 1 to FIG. 6—necessary and the use of existing devices of the user for the configuration, for example via smartphone via BLE is possible. By using the antenna according to the invention in the form of an angled dipole D with at least one structural element, in particular a 3-pin header, the operating device can be operated from each direction and no "dead spots" arises.

The diverse application possibilities of the complete device according to the invention will be further clarified with reference to three application examples. In the first application example, the starting point is an electronic electricity meter with CEN A-PLC connection (CEN A=A-band according to Cenelec standard DIN EN 50065, released for network operators for network operation (control, meter reading, . . . )) to the network operator and a Bridge CEN A-CEN BCD (CEN BCD=B- or C- or D-band according to Cenelec standard DIN EN 50065, released for users, for example in the home, in industrial plants, but also for street lighting) for displaying the meter readings by users. Now radio meters for water and gas in bathroom and cellar are to be integrated into the remote reading. For this purpose, the user exchanges in the bathroom and cellar each existing lamp with a new lamp with integrated BLE-PLC gateway (see FIGS. 7 and 8) and the installation has taken place. The data of the counters are then automatically forwarded to the accounting point for billing.

In the second application example, the starting point is home automation by means of a powerline communication PLC via a central control unit or a PLC-capable consumer. Now, another switch element is to be installed at a new location, where no lines are available. The customer uses a wireless switch and integrates this by replacing an existing lamp with a new lamp with integrated BLE-PLC gateway (see FIG. 7 and FIG. 8) in the automation system. Using a configuration application on his smartphone, the user configures the function of the new switch via BLE.

In the third application example, the starting point is an existing PLC-BLE infrastructure for home automation, for example in a residential building. The customer notes that the radio range is not sufficient for further expansion of its equipment to install equipment in the remote garage with power connection. Now, in the area of the planned extension, he replaces an existing lamp with a new lamp with integrated BLE-PLC gateway (see FIGS. 7 and 8), whereby the radio range is extended accordingly. The gateway function exchanges the data of the new radio elements via PLC with the previous system, even if no direct radio connection is possible.

FIG. 10a to FIG. 10d shows the temporal current-voltage curve in the operating device according to the invention, wherein the current- or voltage-amplitudes are an example. In FIG. 10a the time profile of a standard current pulse 8/20 μs with a peak value of about 10 kA is shown. In a pulse generator with 2 Ohm internal resistance this corresponds to a 1.5/50 μs voltage pulse with a peak value of 20 kV at the input of the coarse protection G. Furthermore, is shown in FIG. 10b, the time profile of the associated terminal voltage of the coarse protection G, in FIG. 10c the time profile of the output voltage of the line filter NF and in FIG. 10d the time profile of the current through the clamping circuit K of the operating device according to the invention.

In the first time window, the maximum energy of the pulse is short-circuited when the ignition voltage of the gas extractor 1 is exceeded. The remaining pulse which is not short-circuited by the coarse protection G (as described above with reference to the line filter NF) is delayed and folded by the line filter NF.

In the second time window, a small energy contribution of the pulse from the fine protection F, which is contained in the clamping circuit K, is absorbed.

In the third time window, the energy absorber E1 is activated by the response of the fine protection F. This means that the remaining pulse energy from the energy absorber E1 is shorted. At the next zero crossing of the mains voltage, the short circuit is automatically canceled.

The invention is not limited to the illustrated and described embodiments, but also includes all the same equivalent versions in the context of the invention.

The invention claimed is:

1. An operating device with an input coarse protection (G), an output with separate interface circuits (SSI, SS2) and an output fine protection (F) and between the coarse protection (G) and the fine protection (F) arranged a decoupling for protection, control and power supply connected thereto lamps formed as a filter, wherein the coarse protection (G), which short-circuiting the mains voltage occurring at the input of the operating device, is connected both a first branch for connecting a lighting means to a first of the interface circuits (SS1) and a second branch for the connection of at least one communication module to a second of the interface circuits (SS2), wherein in the first branch with the coarse protection (G) a line filter (NF) is connected, which delays, reduces and folds the overvoltage pulse limited by the coarse protection (G) for the subsequent circuit parts and reduces the slew rate, wherein with the line filter (NF) a clamping circuit (K), consisting of the fine protection (F) and a first energy absorber (E1), is connected, whereby at too high residual voltage of the pulse the fine protection (F) of the first energy absorber (EI) is activated and the overvoltage pulse is short-circuited and the short circuit is deactivated again when the next zero crossing of the mains voltage is reached, wherein a second energy absorber (E2) is connected to the first energy absorber (EI), which is switched on by means of a temperature-dependent resistor (NTC), limits the current and wherein to protect the output side interface circuit (SSI) of the operating device from overvoltages and overcurrent that act on the operating device from the light source, the first interface circuit (SSI) has an overvoltage and overcurrent protection (ÜS) and that in the second branch with the coarse protection (G) a middle protection (M), consisting of a transformer (Ü) and a first fine protection circuit (F1) is connected, wherein the transformer (Ü) goes into saturation during the overvoltage pulse, wherein with the first fine protection circuit (F) a second filter (FK) for the separation of parallel to the power supply network fed communication signals is connected and a second fine-protection circuit (F2) is connected to the second filter (FK) and wherein to protect the second interface circuit (SS2) of the operating device against overvoltages and overcurrent, which act on the operating device from the communication module, the second interface circuit (SS2) has another overvoltage- and overcurrent-protection (ÜS), whereby the staggered protective measures from the input and the output, protection of the entire operating device and downstream devices is ensured.

2. The operating device according to claim 1, wherein the coarse protection (G) has a gas discharge tube (1) and two varistors (2) in series with the gas discharge tube (1) and that for thermal coupling a thermal fuse (4) is placed very close to the varistors (2), so that the end of life of the varistors (2) is detected by this flowing increased leakage current.

3. The operating device according to claim 2, wherein the operating device comprises a monitoring circuit (3) arranged between one of the varistors (2) and the thermal fuse (4), which detects the separation of the coarse protection (G) from the supply voltage and reports to a microprocessor of the operating device.

4. The operating device according to claim 1, wherein for the functional safety of the operating device, a second thermal fuse (5) is arranged between the N-conductor connection and the coarse protection (G).

5. The operating device according to claim 4, wherein on the housing of the operating device, a display means (6) is arranged, which indicates the response of the second thermal fuse (5).

6. The operating device according to claim 1, wherein to protect the components in the clamping circuit (K) before fast voltage and current increases, at the input of the clamping circuit (K) an inductance is installed and that the fine protection (F) of the clamping circuit (K) is realized by clamping diodes and the first energy absorber (E1) by means of a TRIAC.

7. The operating device according to claim 1, wherein for inrush current limiting the second energy absorber (E2) looped in the N-conductor has the temperature-dependent resistor (NTC) and that after a few network periods, the resistor (NTC) automatically via a first switch (S1) is short-circuited and in the event that the energy absorber (E2) detects an overvoltage during operation, the resistor (NTC) by means of a second switch (S2) automatically switched back into a ground line and that after the decay of the voltage pulse the resistor (NTC) is automatically short-circuited via the first switch (S1).

8. The operating device according to claim 1, wherein the overvoltage and overcurrent protection (ÜS) arranged at the output of the operating device in the interface circuits (SS1, SS2), each initially seen from the output comprising a second coarse protection (GÜ), then an associated with a third filter (FÜ), which delays and reduces the by the second coarse protection (GÜ) limited overvoltage pulse for the subsequent circuit parts, and finally connected to the third filter (FÜ) a fine protection (FSÜ).

9. The operating device according to claim 1, wherein if no function of the operating device is needed, a microprocessor (MP) of the operating device turns off by disabling an auxiliary power supply and switching to ECO-mode, and that leaving the ECO-modes is by means of the microprocessor (MP) time-controlled or by detecting the switching-off and switching-on of the mains voltage or by a communication module connected to the operating device.

10. The operating device according to claim 1, wherein the operating device has for controlling, for querying status messages of the ballast, for initializing the parameters of a lighting means (12) and for updating the firmware of the operating device, at least a powerline communication interface (PA) and that the operating device operates as a gateway between the individual communication interfaces.

11. A lighting mean with an operating device according to claim 1, wherein the lighting means consists of an upper light-emitting part with light-emitting diodes (12) and configured as a device base with terminal base lower light-emitting part, that the connection base is formed as a screw thread ring contact (E) and foot contact (FK) and in which the electronics are arranged both for the lighting control, as well as for a powerline communication PLC and Bluetooth low energy BLE communication including an overvoltage and overcurrent protection.

12. The lighting means according to claim 11 with an antenna, wherein it is in the form of an angled dipole (D) having at least one structural element (ST1, ST2), which connects the antenna to the third dimension extended.

13. The lighting means according to claim 12, wherein the structural element is designed as a pin header (ST1, ST2), which extends perpendicular to the conductor track of the angled dipole (D).

14. The operating device according to claim 1, wherein the line filter (NF) is constructed as an LC-filter forth order with low-pass behavior and insulated against ground potential (ground conductor PE).

15. The operating device according to claim 1, wherein as protection against temporary overvoltage, the line filter (NF) has a relay (Re) located in the phase conductor (L).

\* \* \* \* \*